United States Patent
Ke et al.

(10) Patent No.: US 10,841,768 B2
(45) Date of Patent: Nov. 17, 2020

(54) METHOD AND EQUIPMENT FOR DETERMINING IOT SERVICE, AND METHOD AND EQUIPMENT FOR CONTROLLING IOT SERVICE BEHAVIOR

(71) Applicant: Samsung Electronics Co., Ltd, Suwon-si (KR)

(72) Inventors: Xiaowan Ke, Beijing (CN); Lixiang Xu, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 16/069,153

(22) PCT Filed: Jan. 11, 2017

(86) PCT No.: PCT/KR2017/000372
§ 371 (c)(1),
(2) Date: Jul. 10, 2018

(87) PCT Pub. No.: WO2017/123002
PCT Pub. Date: Jul. 20, 2017

(65) Prior Publication Data
US 2019/0037377 A1 Jan. 31, 2019

(30) Foreign Application Priority Data

Jan. 11, 2016 (CN) .......................... 2016 1 0016970

(51) Int. Cl.
*H04W 4/70* (2018.01)
*H04W 8/18* (2009.01)
(Continued)

(52) U.S. Cl.
CPC ............... *H04W 4/70* (2018.02); *H04L 67/16* (2013.01); *H04W 8/18* (2013.01); *H04W 48/00* (2013.01);
(Continued)

(58) Field of Classification Search
CPC ......... H04W 4/70; H04W 8/18; H04W 48/00; H04W 88/02; H04L 67/16
See application file for complete search history.

(56) References Cited

U.S. PATENT DOCUMENTS 8,767,571 B2 7/2014 Faurie et al.
9,042,221 B2 5/2015 Kim et al.
(Continued)

FOREIGN PATENT DOCUMENTS

WO 2011/063559 A1 6/2011
WO 2011/136589 A2 11/2011

OTHER PUBLICATIONS

International Search Report dated Apr. 19, 2017 in connection with International Patent Application No. PCT/KR2017/000372.
(Continued)

*Primary Examiner* — Kent Krueger

(57) ABSTRACT

The present invention provides a method for determining an IOT service, comprising the following steps of: acquiring, by a first node, IOT capacity information and/or IOT preference information from a second node; and, determining, by the first node, an IOT behavior of a UE according to the acquired IOT capacity information and/or IOT preference information. The present application further discloses a corresponding equipment for determining an IOT service. The present application further discloses a method and equipment for controlling an IOT service behavior, and a method and equipment for selecting a core network node. With the present application, the overhead for signaling
(Continued)

resources can be effectively reduced, and the utilization ratio of resources can be improved.

20 Claims, 16 Drawing Sheets

(51) Int. Cl.
    *H04W 48/14*     (2009.01)
    *H04W 48/00*     (2009.01)
    *H04L 29/08*     (2006.01)
    *H04W 84/04*     (2009.01)
    *H04W 88/02*     (2009.01)

(52) U.S. Cl.
    CPC .......... *H04W 48/14* (2013.01); *H04W 84/042* (2013.01); *H04W 88/02* (2013.01)

(56) References Cited

U.S. PATENT DOCUMENTS

| | | |
|---|---|---|
| 2013/0100895 A1 | 4/2013 | Aghili et al. |
| 2014/0192733 A1 | 7/2014 | Charbit et al. |
| 2019/0261158 A1* | 8/2019 | Ianev .................... H04W 8/065 |

OTHER PUBLICATIONS

Written Opinion of the International Searching Authority dated Apr. 19, 2017 in connection with International Patent Application No. PCT/KR2017/000372.

* cited by examiner

METHOD AND EQUIPMENT FOR DETERMINING IOT SERVICE, AND METHOD AND EQUIPMENT FOR CONTROLLING IOT SERVICE BEHAVIOR

CROSS-REFERENCE TO RELATED APPLICATIONS AND CLAIM OF PRIORITY

This application is a 371 of International Application No. PCT/KR2017/000372 filed on Jan. 11, 2017, which claims priority to Chinese Patent Application No. 201610016970.X filed on Jan. 11, 2016, the disclosures of which are herein incorporated by reference in their entirety.

BACKGROUND

1. Field

The present invention relates to the radio communication technology, and in particular to a method and equipment for determining an Internet Of Things (IOT) service, a method and equipment for controlling an IOT service behavior, and a method and equipment for selecting a core network node.

2. Description of Related Art

The modern mobile communication increasingly tends to focus on multimedia services that provide users with high-rate transmission. FIG. 1 is a system architecture diagram showing the System Architecture Evolution (SAE). Wherein:

A User Equipment (UE) 101 is a terminal equipment supporting a network protocol. An Evolved Universal Terrestrial Radio Access Network (E-UTRAN) 102 is a radio access network in which an eNodeB/NodeB providing the UE with an interface for accessing the radio network is included. A Mobility Management Entity (MME) 103 is responsible for managing a movement context, a session context and security information for the UE. A Serving Gateway (SGW) 104 mainly functions to provide a user plane, and the MME 103 and the SGW 104 may be in a same physical entity. A Packet Data Network Gateway (PGW) 105 is responsible for charging, lawful interception or more, and the PGW 105 and the SGW 104 may also be in a same physical entity. A Policy and Charging Rules Function Entity (PCRF) 106 provides Quality of Service (QoS) policy and charging rules. A Serving GPRS Support Node (SGSN) 108 is a network node equipment providing routing for data transmission in a Universal Mobile Telecommunication System (UMTS). A Home Subscriber Server (HSS) 109 is a home subsystem of the UE, and is responsible for protecting user information comprising the current location of the UE, the address of a serving node, user security information, a packet data context of the UE, or more.

SUMMARY

At present or in the foreseeable future, there will be more and more electric appliances to become intelligent and accessories for daily use to be networked, all of which have a function of accessing to a network. These UEs often have the following features: static or lowly mobile; low in cost; and, often small in volume and discontinuous in terms of the received or transmitted data. For these UEs, the signaling overhead generated by establishing a connection and releasing a connection is far higher than the volume of the received or transmitted data. In order to save the signaling overhead and improve the efficiency of data transmission, there are still many problems to be solved in the existing networks.

In view of this, the present application provides a method and equipment for determining an IOT service, a method and equipment for controlling an IOT service behavior, and a method and equipment for selecting a core network node, in order to effectively reduce the overhead of signaling resources and improve the utilization ratio of resources.

The present invention provides a method for determining an Internet Of Things (IOT) service, comprising the following steps of:

acquiring, by a first node, IOT capacity information and/or IOT preference information; and determining, by the first node, an IOT behavior of a User Equipment (UE) according to the acquired IOT capacity information and/or IOT preference information.

Preferably, the IOT capacity information and/or IOT preference information acquired by the first node comprises: the IOT capacity of the UE, a radio access network node and a core network node; and the determining an IOT behavior of a UE comprises: using, by the first node and according to the IOT capacity of the UE, the radio access network node and the core network node, an IOT behavior supported by all of the UE, the radio access network node and the core network node as an IOT behavior of the UE.

Preferably, the IOT preference information comprises: an IOT behavior preferred or requested by the UE; and the determining an IOT behavior of a UE comprises:

using, by the first node, the IOT behavior preferred or requested by the UE as an IOT behavior of the UE, when all of the UE, the radio access network node and the core network node support the IOT behavior preferred or requested by the UE; and using, by the first node, at least one IOT behavior supported by all of the UE, the radio access network node and the core network node as an IOT behavior of the UE, when the radio access network node or the core network node does not support the IOT behavior preferred or requested by the UE.

Preferably, the method further comprises: acquiring, by the first node, IOT subscription information of the UE; and the determining an IOT behavior of a UE comprises: using, by the first node and according to the IOT capacity of the UE, the radio access network node and the core network node and the IOT subscription information of the UE, an IOT behavior, which is supported by all of the UE, the radio access network node and the core network node and allowed to access by the IOT subscription information of the UE, as an IOT behavior of the UE.

Preferably, the IOT preference information comprises: an IOT behavior preferred or requested by the UE; and the determining an IOT behavior of a UE comprises:

using, by the first node, the IOT behavior preferred or requested by the UE as an IOT behavior of the UE, when all of the UE, the radio access network node and the core network node support the IOT behavior preferred or requested by the UE and the subscription information of the UE allows the IOT behavior preferred or requested by the UE; and using, by the first node, at least one IOT behavior, which is supported by all of the UE, the radio access network node and the core network node and is allowed by the IOT subscription information of the UE, as an IOT behavior of the UE, when the radio access network node or the core network node does not support the IOT behavior preferred or requested by the UE or the IOT subscription information of the UE does not allow the IOT behavior preferred or requested by the UE.

Preferably, the IOT subscription information comprises: an allowed IOT behavior and/or disallowed IOT behavior; and the IOT subscription information is IOT subscription information of the UE within a current PLMN, and the IOT subscription information of the UE within different PLMNs is identical or different.

Preferably, the first node is a core network node, and the core network node acquires the IOT capacity information and/or IOT preference information from at least one of the following nodes: a UE, a radio access network node, and a core network node other than the first node; or the first node is a radio access network node, and the radio access network node acquires the IOT capacity information and/or IOT preference information from at least one of the following nodes: a UE, a core network node, and a radio access network node other than the first node; or the first node is a UE, and the UE acquires the IOT capacity information and/or IOT preference information from at least one of the following nodes: a radio access network node, a core network node, and a UE other than the first node.

Preferably, the method further comprises: by the first node, carrying the determined IOT behavior of the UE in IOT service behavior information of the UE and then transmitting the IOT service behavior information of the UE to a third node;

when the first node is a core network node, the third node is a UE and/or a radio access network node;

when the first node is a radio access network node, the third node is a UE and/or a core network node; and when the first node is a UE, the third node is a radio access network node and/or a core network node.

Preferably, the IOT capacity comprises at least one of the following: IOT resource optimization capacity, IOT data transmission optimization capacity, IOT radio capacity, IOT core network capacity, IOT control plane capacity, IOT user plane capacity, IOT S1-U data transmission capacity, IOT short-message capacity, and supported radio access technology type.

Preferably, the IOT resource optimization capacity comprises at least one of the following: IOT resource allocation, not handing over the UE, and a non-GBR bearer; and/or the IOT data transmission optimization comprises at least one of the following: IOT control plane data transmission optimization capacity, IOT user plane data transmission optimization capacity, and IOT short-message data transmission optimization capacity; and/or the IOT control plane capacity comprises at least one of the following: data transmission via a control plane, no access stratum security context, allowing for no UE bearer when in a connected state, allowing to not release Uu port resources when removing all UE bearers, IOT resource allocation, not handing over the UE, and a non-Guaranteed Bit Rate (GBR) bearer; and/or the IOT user plane capacity comprises at least one of the following: data transmission via a user plane, resuming to no access stratum security context when a connection is established or there is data transmission requirement, IOT resource allocation, not handing over the UE, and a non-GBR bearer; and/or the IOT S1-U data transmission capacity is IOT user plane non-optimization data transmission capacity; and/or the IOT short-message capacity is carrying data in a short message; and/or the supported radio access technology type comprises at least one of the following: a radio access network technology supporting an IOT only, a radio access network technology not supporting a Narrow Band Internet Of Things (NB IOT), and a radio access network technology supporting not only an IOT.

Preferably, the IOT behavior comprises at least one of the following: access to an IOT, access to a non-IOT, IOT control plane optimization, IOT user plane optimization, IOT short-message data transmission, S1-U data transmission, IOT resource optimization, IOT data transmission optimization, and accessed radio access technology type.

Preferably, IOT behaviors supported by the IOT capacity are as follows:

the capacity of non-IOT at least supports one of the following IOT behaviors: a non-IOT resource allocation behavior, wideband resource allocation information, access to a non-IOT radio access network technology, and S1-U data transmission mode;

the IOT resource optimization capacity at least supports one of the following IOT behaviors: an IOT resource optimization behavior and an IOT resource allocation behavior;

the IOT data transmission optimization capacity at least supports one of the following IOT behaviors: IOT data transmission optimization and an IOT resource allocation behavior;

the IOT control plane capacity at least supports one of the following IOT behaviors: IOT control plane optimization and an IOT resource allocation behavior;

the IOT user plane capacity at least supports one of the following IOT behaviors: IOT user plane optimization and an IOT resource allocation behavior;

the IOT S1-U data transmission capacity at least supports one of the following IOT behaviors: S1-U data transmission and an IOT resource allocation behavior;

the IOT short-message transmission capacity at least supports one of the following IOT behaviors: IOT short-message data transmission and an IOT resource allocation behavior; and the supported radio access technology type at least supports the following IOT behavior: accessed radio access technology type.

Preferably, the IOT control plane optimization comprises at least one of the following: data transmission via a control plane, no access stratum security context, allowing for no UE bearer when in a connected state, allowing to not release Uu port resources when removing all UE bearers, IOT resource allocation, the radio access technology type being an NB IOT, not handing over the UE, allowing for a non-GBR bearer only, and rejecting a GBR bearer; and/or the IOT user plane optimization comprises at least one of the following: data transmission via a user plane, resuming to no access stratum security context when a connection is established, resuming to no access stratum security context when there is data transmission requirement, IOT resource allocation, the radio access technology type being an NB IOT, not handing over the UE, allowing for a non-GBR bearer only, and rejecting a GBR bearer; and/or the S1-U data transmission comprises at least one of the following: data transmission via a user plane, IOT resource allocation, the radio access technology type being an NB IOT, not handing over the UE, allowing for a non-GBR bearer only, and rejecting a GBR bearer; and/or the IOT short-message data transmission mode comprises at least one of the following: data transmission via a short message, IOT resource allocation, the radio access technology type being an NB IOT, not handing over the UE, allowing for a non-GBR bearer only, and rejecting a GBR bearer; and/or the IOT resource optimization comprises at least one of the following: IOT resource allocation, the radio access technology type being an NB IOT, not handing over the UE, a non-GBR bearer, and rejecting a GBR bearer; and/or the preferentially accessed radio access network type comprises at least one of the following: a radio access network supporting an IOT only, a radio access network not supporting an IOT, and a radio access network supporting an IOT and others.

Preferably, the IOT service behavior information of the UE contains at least one of the following: Public Land Mobile Network (PLMN) information, IOT behavior information, UE bearer information, an Internet Protocol (IP) header compression indication, a service type, Uu resource release information, resource allocation information, handover information, access stratum security context information, and GBR information; and the PLMN information refers to a list of PLMN identifiers allowed by the determined IOT service.

Preferably, the UE bearer information comprises at least one of the following: UE bearer identifier, an IP header compression indication, a service type, a service type, Uu resource release information, resource allocation information, handover information, access stratum security context information, and GBR information;

the IP header compression indication contains an indication of whether to perform IP header compression or is embodied by a data type;

the service type comprises at least one of the following: whether it is an IOT, whether to perform IOT control plane optimization, and whether to perform IOT user plane optimization;

the Uu resource release information comprises at least one of the following: whether to release Uu resources, and whether to maintain a UE connection when there is no UE bearer;

the resource allocation information comprises at least one of the following: whether to allocate IOT resources, whether to allocate wideband resources, and whether to perform resource optimization;

the handover information comprises at least one of the following: whether to allow to hand over the UE;

the access stratum security context information comprises at least one of the following: whether the access stratum security context is required, whether to encrypt an access stratum, and whether to encrypt the user plane; and the GBR bearer information comprises at least one of the following: not allowing or rejecting to establish a GBR bearer, and allowing to establish a non-GBR bearer only.

The present application further provides an equipment for determining an IOT service, comprising an information acquisition module and a processing module, wherein:

the information acquisition module is configured to acquire, from a second node, IOT capacity information and/or IOT preference information; and the processing module is configured to determine an IOT behavior of a UE according to the acquired IOT capacity information and/or IOT preference information.

The present application further provides a method for controlling an IOT service behavior, comprising the following steps of:

receiving, by a third node, an IOT behavior of a UE determined by a first node; and performing, by the third node, a corresponding IOT service behavior control on the UE according to the IOT behavior of the UE.

Preferably, the third node is a radio access network node;

when the IOT behavior of the UE is control plane optimization, the radio access network node performs at least one of the following IOT control plane optimization behavior controls:

transmitting data via a control plane;

releasing Uu when monitoring that the inactive time of the control plane data transmission exceeds a set time;

allowing for no setup of any UE bearer when a connection is established;

allowing for no setup of a UE access stratum security context, and allowing for no encryption of an access stratum;

allocating IOT resources for an IOT service of the UE;

not allowing for handover;

supporting the setup of a non-GBR bearer only, and rejecting the setup of a GBR bearer;

maintaining, by the radio access network node, a connection to the UE and Uu port resources when all radio bearers of the UE are removed; and allocating NB IOT resources when the accessed radio network technology type is an NB IOT; and/or when the IOT behavior of the UE is user plane optimization, the radio access network node performs at least one of the following IOT user plane optimization behavior controls:

transmitting data via a user plane bearer;

suspending and resuming a context of the UE as required;

allocating IOT resources for the IOT service of the UE;

not allowing for handover;

supporting the setup of a non-GBR bearer only, and rejecting the setup of a GBR bearer;

making the accessed radio network technology type be an NB IOT; and allocating IOT resources; and/or when one of the following is determined: the IOT behavior of the UE is resource optimization, the IOT behavior of the UE is IOT, the service type of a UE bearer is resource optimization and the service type of the UE bearer is IOT, the radio access network node performs at least one of the following IOT resource optimization behavior controls:

making the accessed radio network technology type be an NB IOT;

allocating IOT resources for the IOT service of the UE;

not allowing for handover; and supporting the setup of a non-GBR bearer only, and rejecting the setup of a GBR bearer; and/or when the IOT behavior of the UE is user plane non-optimization or S1-U data transmission, the radio access network node performs at least one of the following IOT S1 data transmission behavior controls: transmitting data via a user plane, allocating IOT resources for the IOT service of the UE, not allowing for handover, supporting the setup of a non-GBR bearer only, and rejecting the setup of a GBR bearer; and/or when the IOT behavior of the UE is short-message data transmission, the radio access network node performs at least one of the following IOT short-message behavior controls: transmitting data via a short message, allocating IOT resources for the IOT service of the UE, not allowing for handover, supporting the setup of a non-GBR bearer only, and rejecting the setup of a GBR bearer; and/or when it is determined that the data bearer of the UE is non-IP, the radio access network node does not perform UE IP compression.

The present application further provides an equipment for controlling an IOT service behavior, comprising an information receiving module and a behavior control module, wherein:

the information receiving module is configured to receive an IOT behavior of a UE determined by a first node; and the behavior control module is configured to perform a corresponding IOT service behavior control on the UE according to the IOT behavior of the UE.

The present application further provides a method for selecting a core network node, comprising the following steps of:

acquiring, by a radio access network node, IOT capacity information and/or IOT preference information from a second node; and selecting, by the radio access network node, a matched core network node for a UE according to the acquired IOT capacity information and/or IOT preference information.

Preferably, the selecting a matched core network node for a UE comprises at least one of the following:

selecting a core network node supporting the IOT preference information of the UE;

selecting a core network node supporting the IOT capacity information of the UE and the IOT preference information of the UE;

selecting a core network node supporting the IOT capacity information of the UE but not supporting the IOT preference information of the UE: selecting a core network node supporting the IOT capacity information of the UE if there is no core network node supporting the IOT preference information of the UE;

selecting a core network node supporting a part of the IOT capacity of the UE: selecting a core network node supporting a part of the IOT capacity of the UE if there is no core network node supporting all of the IOT capacity of the UE;

selecting a core network node supporting the IOT capacity information of the radio access network; and selecting a core network node supporting a part of the IOT capacity information of the radio access network.

The present application further provides an equipment for selecting a core network node, comprising an information acquisition module and a matching module, wherein:

the information acquisition module is configured to acquire, from a second node, IOT capacity information and/or IOT preference information; and the matching module is configured to select a matched core network node for a UE according to the acquired IOT capacity information and/or IOT preference information.

It can be seen from the technical solutions that, by distinguishing the IOT capacity information and IOT preference information of a UE, a radio access network node and a core network node, and determining the IOT resource optimization and IOT data transmission mode of the UE, the overhead for signaling resources can be effectively reduced and the utilization ratio of resources can improved, so that it is favorable for a huge number of IOT equipments to access a network.

It can be seen from the technical solutions that, by distinguishing the IOT capacity information and IOT preference information of a UE, a radio access network node and a core network node, and determining the IOT resource optimization and IOT data transmission mode of the UE, the overhead for signaling resources can be effectively reduced and the utilization ratio of resources can improved, so that it is favorable for a huge number of IOT equipments to access a network.

DETAILED DESCRIPTION

Figure 1:
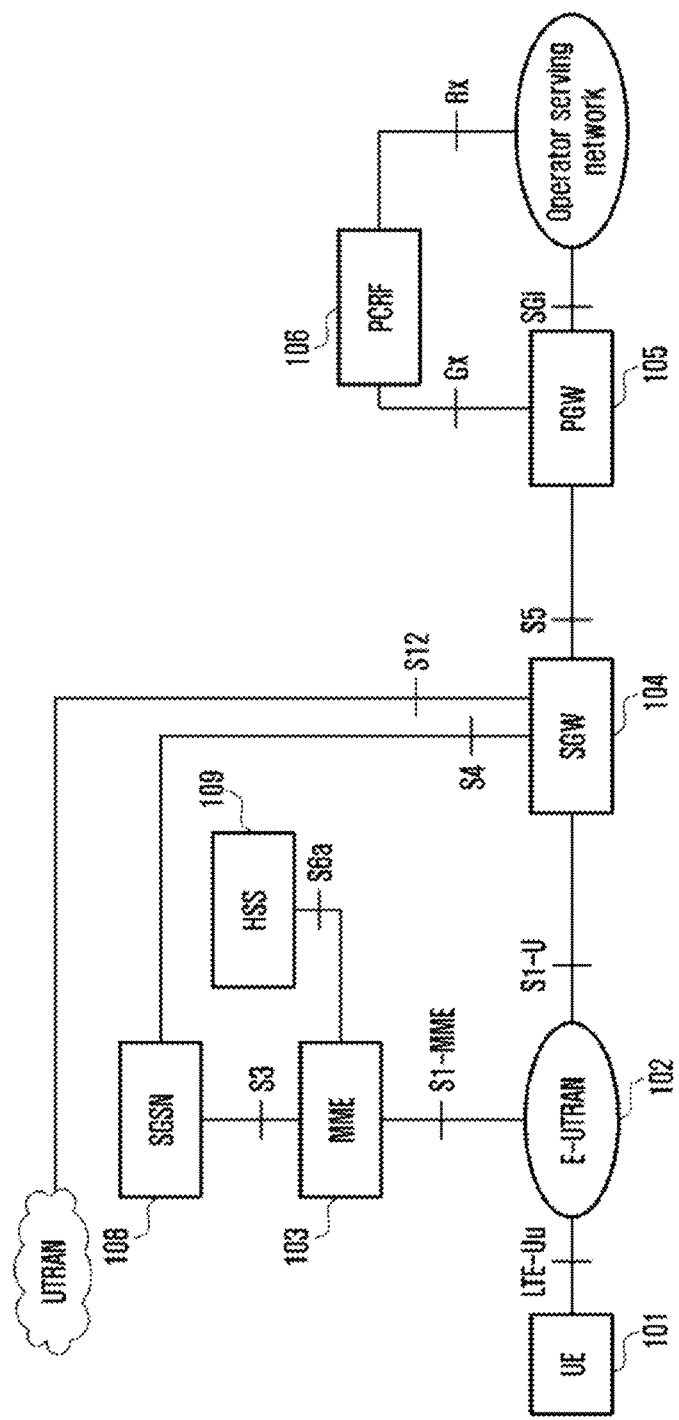
FIG. 1 is a schematic diagram of an existing SAE system architecture.

In order to satisfy the communication requirements for a UE having a small volume of data and a low cost (e.g., Internet Of Thing (IOT) equipments of coverage enhancement (CE), low cost (LC) and Machine Type Communication (MTC)), a communication service of a Cellular IOT (CIOT) is provided. The data for the CIOT can be carried on a control plane (e.g., a Non-Access Stratum Protocol Data Unit (NAS PDU), or carried on a user plane (e.g., a UE bearer). For a CIOT communication service, since the volume of data is small, a base station allocates IOT resources (e.g., narrowband resources) rather than wideband resources. A ratio access network technology for the IOT resource allocation is called as NB IOT. The radio access network node only supporting the NB IOT does not support handover and a Guaranteed Bit Rate (GBR) bearer. When a UE only supporting the NB IOT accesses to a network, the UE may not request a UE bearer (e.g., a radio bearer, an EPS bearer or a PDN connection) for establishing a task. A core network node can support the CIOT only, or support control plane CIOT optimization only, or support user plane CIOT optimization only.

The control plane CIOT optimization means that the data of a UE is carried on a control plane, e.g., an NAS PDU. In this case, it is not required to establish a UE bearer in a radio access network node, nor to establish a radio security context in a radio access network.

The user plane CIOT optimization means that a UE context is suspended when there is no data transmission requirement for a UE, while the UE context is resumed when there is data transmission requirement for the UE, so that the signaling overhead is saved.

The UE supporting the NB IOT will inform a core network of the supported CIOT capacity and the preferred CIOT communication service. Meanwhile, the core network node acquires the capacity of a radio access network, and then informs, according to the capacity of the core network node, the UE of whether to support a CIOT service or a CIOT service determined for the UE.

At present, there are the following possibilities:
1) the radio access network node/core network node/UE may have not only the NB IOT capacity;
2) the radio access network node/core network node/UE supports the NB IOT, but does not necessarily support the user plane CIOT service optimization; and
3) the radio access network node/core network node/UE supports the NB IOT, but does not necessarily support the control plane CIOT service optimization.

There are still the following problems in the prior art.
Problem 1:
When the UE supports not only the NB IOT, the UE may establish both a CIOT service or other services. When the CIOT service is carried on a control plane, that is, when the control plane CIOT optimization is implemented, other services are still carried on UE bearers. When other UE bearers are removed, in accordance with the existing requirements, a connection to the UE is to be released, and air interface resources are to be released. However, if there is still a CIOT service at this time, the service will be interrupted. Actually, the CIOT service allows the UE to not establish any UE bearer.

When the radio access network node supports not only the NB IOT and the UE also supports not only the NB IOT, the radio access network node does not know whether a handover process can be triggered for the UE. If the UE is performing a non-CIOT service, the radio access network node can hand over the UE when the handover requirements are satisfied; however, when the UE is performing a CIOT service, the radio access network will not handover the UE in any case.

When the radio access network node supports not only the NB IOT and the UE also supports not only the NB IOT, it is possible for the UE to request a CIOT service or request a non-CIOT service, and the base station does not know whether to allocate narrowband resources or wideband resources.

When the radio access network node supports not only the NB IOT and the UE also supports not only the NB IOT, the UE requests a CIOT service, which can preferentially be control plane CIOT optimization, user plane CIOT optimization or user plane CIOT non-optimization. For the control plane CIOT optimization, a radio security context is not required; while for the user plane CIOT optimization, when the UE is inactive over a period of time (for example, there is no data on a UE bearer), the radio access network node will request the core network node to suspend the UE context. However, due to the lack of related information, the radio access network node cannot determine an appropriate behavior.

The NB IOT capacity and the CIOT capacity can be two kinds of capacity.

Problem 2: When the core network node supports a CIOT only, or supports control plane CIOT optimization only or supports user plane CIOT optimization only, and when the UE requests a CIOT service, the radio access network does not know the preference of the CIOT service of the UE and how to select a core network node although the radio access network node knows the NB IOT service of the UE.

Problem 3: It is unclear how the radio access network acquires the capacity of the UE and the capacity of the core network node.

Problem 4: It is unclear how the core network node acquires the capacity of the radio access network node.

To make the objectives, technical solutions and advantages of the present application clearer, the present application will be further described below in details by embodiments with reference to the accompanying drawings.

The IOT mentioned hereinafter refers to a CIOT or an NB IOT.

The IOT control plane can also be called as IOT control plane optimization, that is, data is carried on the control plane, for example, NAS PDU.

The IOT user plane can also be called as IOT user plane optimization, or comprise IOT user plane non-optimization and IOT user plane optimization. The IOT user plane optimization is a process of carrying data on a UE bearer in the user plane and optimizing the signaling, for example, suspending and resuming a UE context replacing the release and setup of a connection respectively (that is, the UE context is suspended when the connection should be released, and the UE context is resumed when the connection should be established), so that the signaling during the setup of a connection to the UE is saved. The IOT user plane non-optimization is that the data is carried on a UE bearer in the user plane but no optimization is performed. The IOT user plane non-optimization is also called as a S1-U data transmission or UE radio bear transmission mode.

The radio access network node can be a base station, an eNB, a NodeB or more.

The core network node can be an MME, an SGSN or more.

Figure 2:
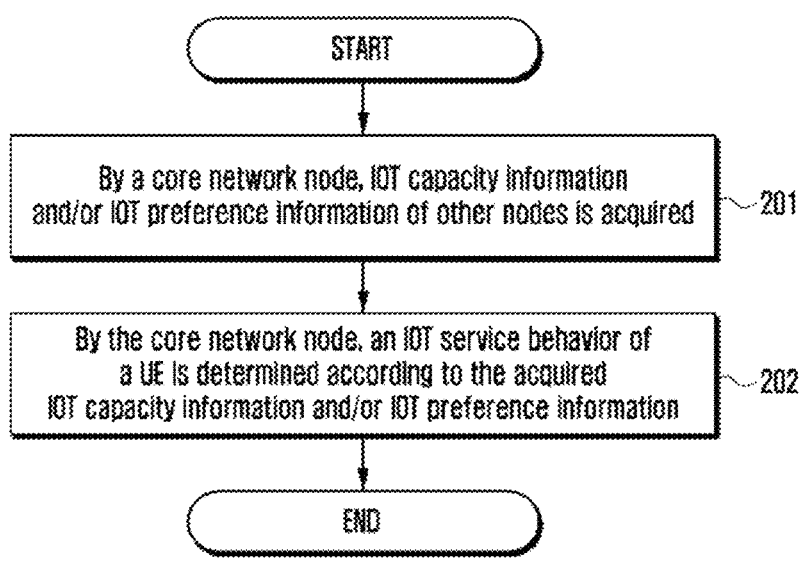
FIG. 2 is a schematic flowchart of a first method for determining an IOT service according to the present invention.
Figure 3:
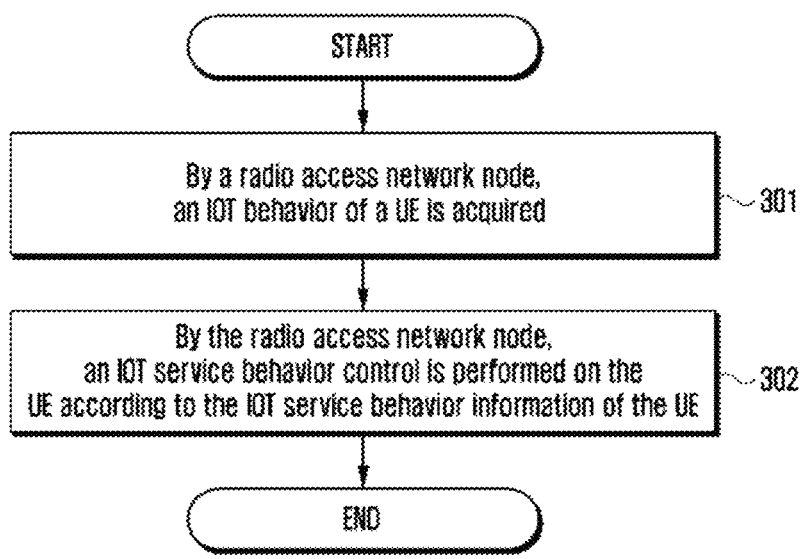
FIG. 3 is a schematic flowchart of a method for controlling an IOT service behavior according to the present invention.

FIGS. 2 and 3 show the determination of an IOT service behavior of a UE by a core network node.

FIG. 2 is a schematic flowchart of a first method for determining an IOT service according to the present invention, comprising the following steps.

Step 201: By a core network node, IOT capacity information and/or IOT preference information of other nodes is acquired.

Optionally, the CIOT capacity information and/or IOT preference information at least comprises one of the following: related information about the IOT capacity supported by a UE/a radio access network node/a core network node, and related information about the IOT preference of the UE/the radio access network node/the core network node. In some implementations, the IOT preference is a preferred or requested IOT service. Wherein, "the IOT capacity supported by the UE/the radio access network node/the core network node" is the abbreviation of "the IOT capacity supported by the UE, the IOT capacity supported by the radio access network node and the IOT capacity supported by the core network node". Other similar descriptions herein will be interpreted in the above way.

In some implementations, the core network node acquires, from at least one of the UE, the radio access network node and other core network nodes, IOT capacity information and/or IOT preference information.

In some implementations, the IOT capacity information and/or IOT preference information can be carried in one or more of the following messages: an RRC connection setup request, an RRC connection setup, an RRC connection setup completion, an RRC connection resume request, an RRC connection resume completion, an initial UE message, an uplink NAS transport, a UE context resume request, a paging message, a broadcast message, and an S1 interface setup request.

Optionally, the IOT capacity information supported by the UE/the radio access network node/the core network node is whether the UE/the radio access network node/the core network node support the IOT capacity. Optionally, the IOT capacity of the UE can comprise one or more or an intersection of more of the following:

capacity of non-IOT;

IOT resource optimization capacity (e.g., capacity for accessing a narrowband resource) or IOT data transmission optimization capacity;

IOT radio capacity, or IOT core network capacity;

IOT control plane capacity, IOT user plane capacity, IOT S1-U data transmission capacity or IOT short-message data transmission capacity; and supported radio access technology type.

Optionally, the supported radio access technology type comprises one or more of the following: a radio access technology supporting an IOT only (e.g., NB IOT), a radio access network technology not supporting an NB IOT (e.g., WB EUTRAN wideband), and a radio access network technology supporting not only an IOT (e.g., supporting also the NB IOT and the WB EUTRAN).

In some implementations, the IOT capacity can comprise one or more of the following: the capacity for accessing the non-IOT radio access technology (e.g., WB EUTRAN), non-IOT resource allocation capacity (e.g., wideband resource allocation capacity), and S1-U data transmission capacity.

In some implementations, the IOT is further classified into an NB IOT and a CIOT, which can have different capabilities. For example, the NB IOT focuses on the resource allocation optimization (e.g., narrowband resource allocation), while the CIOT focuses on the data transmission optimization, for example, optimization carried on the control plane or optimization of data carried on the user plane.

In some implementations, the IOT resource optimization capacity can comprise one or more of the following: IOT resource allocation, not handing over the UE, and a non-GBR bearer. The IOT data transmission optimization can comprise one or more of the following: IOT control plane data transmission optimization capacity, IOT user plane data transmission optimization capacity, and IOT short-message data transmission optimization capacity. In the present application, the resources involved in the IOT resources comprise but are not limited to narrowband resources.

In some implementations, the IOT capacity can further contain IOT radio capacity and IOT core network capacity.

In some implementations, the IOT capacity can further contain IOT control plane capacity and IOT user plane capacity.

In some implementations, the IOT control plane capacity is also called as IOT control plane optimization or IOT control plane optimization data transmission capacity, in which the data is carried on the control plane, for example, an NAS PDU, a tunnel between an MME and an SGW. Optionally, the IOT control plane capacity can comprise one or more of the following: data transmission via a control plane (e.g., an NAS PDU, a tunnel between an MME and an SGW), no access stratum security context, allowing for no UE bearer when in a connected state, allowing to not release Uu port resources when removing all UE bearers, IOT resource allocation, not handing over the UE, and a non-GBR bearer.

In some implementations, the IOT control plane capacity can further contain IOT control plane radio capacity and IOT control plane core network capacity.

In some implementations, the IOT user plane capacity is also called as IOT user plane optimization capacity or IOT user plane optimization data transmission capacity. The IOT user plane optimization capacity or IOT user plane optimization data transmission capacity is a process of carrying data on the user plane and optimizing the signaling, for example, suspending and resuming a UE context replacing the release and setup of a connection respectively, so that the signaling required for the setup of a connection to the UE is saved. The IOT user plane capacity can comprise one or more of the following: data transmission via a user plane, resuming to no access stratum security context when a connection is established or there is data transmission requirement, IOT resource allocation, not handing over the UE, and a non-GBR bearer.

In some implementations, the IOT user plane capacity can further contain IOT user plane radio capacity and IOT user plane core network capacity.

In some implementations, the IOT S1-U data transmission capacity can also be called as IOT user plane non-optimization data transmission capacity, which is a way of carrying IOT data on the user plane without a signaling optimization process.

In some implementations, the IOT user plane capacity comprises IOT user plane optimization data transmission capacity and IOT user plane non-optimization data transmission capacity. The IOT user plane optimization data transmission capacity and the IOT user plane non-optimization data transmission capacity are described above and will not be repeated here.

In some implementations, the IOT short-message transmission capacity is carrying data in a short message, for example, a short message, and a tunnel between an MME and an SGW.

Optionally, the IOT preference information of the UE/the radio access network node/the core network node is an IOT behavior preferred or requested by the UE/the radio access network node/the core network node. Optionally, the IOT behavior can comprise one or more or an intersection of more of the following:

access to an IOT, or access to a non-IOT (e.g., WB EUTRAN);

IOT control plane, or IOT user plane, preferred IOT short-message transmission or S1-U data transmission, where the IOT user plane can further be classified into IOT user plane optimization and CIOT user plane non-optimization;

IOT resource optimization (e.g., an access narrowband resource allocation mode) or IOT data transmission optimization (e.g., an IOT control plane or user plane data transmission mode); and preferentially accessed radio access technology type. The preferentially accessed radio access technology type can comprise one or more of the following: preferentially accessed IOT radio access network technology (e.g., NB IOT) and preferentially accessed non-IOT radio access network technology (e.g., WB EUTRAN). In some implementations, the preferentially accessed IOT radio access network technology refers to preferred IOT resource allocation optimization, for example, narrowband resource allocation.

In some implementations, the IOT is further classified into an NB IOT and a CIOT, which can be different. For example, the NB IOT focuses on the resource allocation optimization (e.g., narrowband resource allocation), while the CIOT focuses on the data transmission optimization, for example, optimization carried on the control plane or optimization of data carried on the user plane.

In some implementations, the access to a non-IOT can comprise one or more of the following: a radio access technology for accessing to a non-IOT (e.g., WB EUTRAN), a non-IOT resource allocation mode (e.g., a wideband resource allocation mode), and an S1-U data transmission mode.

In some implementations, the IOT resource allocation optimization can comprise one or more of the following: IOT resource allocation, the radio access technology type being an NB IOT, not handing over the UE, a non-GBR bearer, or rejecting a GBR bearer.

In some implementations, the IOT can further contain an IOT control plane and an IOT user plane.

In some implementations, the IOT control plane is also called as IOT control plane optimization or IOT control plane optimization data transmission, in which the data is carried on the control plane, for example, an NAS PDU, a tunnel between an MME and an SGW. Optionally, the IOT control plane can comprise one or more of the following: data transmission via a control plane (e.g., an NAS PDU, a tunnel between an MME and an SGW), no access stratum security context, allowing for no UE bearer when in a connected state, allowing to not release Uu port resources when removing all UE bearers, IOT resource allocation, the radio access technology type being an NB IOT, not handing over the UE, and allowing for a non-GBR bearer only/rejecting a GBR bearer.

In some implementations, the IOT user plane is also called as IOT user plane optimization or IOT user plane optimization data transmission. The IOT user plane optimization or IOT user plane optimization data transmission is a process of carrying data on the user plane and optimizing the signaling, for example, suspending and resuming a UE context replacing the release and setup of a connection respectively, so that the signaling required for the setup of a connection to the UE is saved. Optionally, the IOT user plane can comprise one or more of the following: data transmission via a user plane, resuming to no access stratum security context when a connection is established or there is data transmission requirement, IOT resource allocation, the radio access technology type being an NB IOT, not handing over the UE, and allowing for a non-GBR bearer only/rejecting a GBR bearer.

In some implementations, the IOT S1-U data transmission can also be called as IOT user plane non-optimization data transmission, which is a way of carrying IOT data on the user plane without a signaling optimization process. The IOT S1-U data transmission can comprise one or more of the following: data transmission via a user plane, IOT resource allocation, the radio access technology type being an NB IOT, not handing over the UE, and allowing for a non-GBR bearer only/rejecting a GBR bearer.

In some implementations, the IOT user plane comprises IOT user plane optimization data transmission and IOT user plane non-optimization data transmission. The IOT user plane optimization data transmission and the IOT user plane non-optimization data transmission are described above and will not be repeated here.

In some implementations, the preferred IOT short-message is carrying CIOT service data in a short message, and can also be called as an IOT short-message data transmission mode. The IOT short-message data can comprise one or more of the following: data transmission via a short message, IOT resource allocation, the radio access technology type being an NB IOT, not handing over the UE, and allowing for a non-GBR bearer only/rejecting a GBR bearer.

Optionally, the IOT preference implies the IOT capacity required for supporting the IOT preference.

Optionally, preferentially accessed non-IOT can support at least one of the following capacities: radio access technology (e.g., WB EUTRAN) capacity for accessing to the non-IOT, non-IOT resource allocation capacity (e.g., wideband resource allocation capacity), and S1-U data transmission capacity.

Optionally, the preferentially accessed radio access network type comprises one or more of the following: a radio access network supporting an IOT only, a radio access network not supporting an IOT (e.g., supporting WB EUTRAN), and a radio access network supporting an IOT and others (e.g., EUTRAN).

In some implementations, the preferred IOT control plane/IOT control plane optimization/IOT control plane data transmission can support at least one of the following IOT capacities: IOT control plane capacity, IOT control plane radio capacity, IOT control plane core network capacity, IOT capacity, IOT radio capacity, IOT core network capacity, and supported IOT radio access network capacity.

In some implementations, the preferred IOT user plane can support at least one of the following IOT capacities: IOT user plane capacity, IOT user plane radio capacity, IOT user plane core network capacity, IOT capacity, IOT radio capacity, IOT core network capacity, and supported radio access technology type containing IOT.

In some implementations, the preferred IOT user plane optimization/IOT user plane optimization/IOT user plane optimization data transmission can support at least one of the following IOT capacities: IOT user plane capacity, IOT user plane radio capacity, IOT user plane core network capacity, IOT user plane optimization capacity, IOT user plane optimization radio capacity, IOT user plane optimization core network capacity, IOT user plane non-optimization capacity, IOT, IOT radio capacity, IOT core network capacity, and supported radio access technology type containing IOT.

In some implementations, the preferred user plane non-optimization/preferred IOT user non-optimization data transmission/preferred IOT S1-U data transmission can support at least one of the following IOT capacities: user plane non-optimization capacity, S1-U data transmission capacity, IOT capacity, IOT radio capacity, IOT core network capacity, and supported radio access technology type containing IOT.

The preferred optimization resource allocation/NB IOT/IOT can support at least one of the following IOT capacities: IOT resource optimization capacity, IOT capacity, IOT radio capacity, IOT core network capacity, and supported radio access technology type containing IOT. Optionally, the IOT here refers to an NB IOT.

The preferred optimization data transmission/CIOT/IOT can support at least one of the following IOT capacities: IOT data transmission optimization capacity, IOT capacity, IOT radio capacity, IOT core network capacity, and supported radio access technology type NB IOT. Optionally, the IOT here refers to a CIOT.

The preferred IOT short-message/IOT short-message data transmission can support at least one of the following IOT capacities: IOT short-message capacity, IOT capacity, IOT radio capacity, IOT core network capacity, and supported radio access technology type containing IOT.

Step 202: By the core network node, an IOT service behavior of a UE is determined according to the acquired IOT capacity information and/or IOT preference information. Unless otherwise specified, the "IOT service behavior" and the "IOT behavior" in the present application have the same meaning.

In some implementations, the determined IOT behavior of the UE is carried in IOT service behavior information of the UE and then transmitted to the radio access network node and/or the UE.

In some implementations, the IOT service behavior information determined by the core network node is also called as a supported IOT behavior in the network.

In some implementations, the determining an IOT behavior of a UE comprises: determining, by the core network node and according to the IOT capacity of the UE, the radio access network node and the core network node, an IOT behavior of the UE supported by the three.

IOT behaviors supported by the IOT capacity are as follows:

the capacity of non-IOT at least supports one of the following IOT behaviors: a non-IOT resource allocation behavior, wideband resource allocation information, access to a non-IOT radio access network technology, and S1-U data transmission mode;

the IOT resource optimization capacity at least supports one of the following IOT behaviors: an IOT resource optimization behavior and an IOT resource allocation behavior;

the IOT data transmission optimization capacity at least supports one of the following IOT behaviors: IOT data transmission optimization and an IOT resource allocation behavior;

the IOT control plane capacity at least supports one of the following IOT behaviors: IOT control plane optimization and an IOT resource allocation behavior;

the IOT user plane capacity at least supports one of the following IOT behaviors: IOT user plane optimization and an IOT resource allocation behavior;

the IOT S1-U data transmission capacity at least supports one of the following IOT behaviors: S1-U data transmission and an IOT resource allocation behavior; and the IOT short-message transmission capacity at least supports one of the following IOT behaviors: IOT short-message data transmission and an IOT resource allocation behavior.

In some implementations, the IOT preference information comprises: an IOT behavior preferred or requested by the UE; and, the determining an IOT behavior of a UE comprises:

using, by the core network node, the IOT behavior preferred or requested by the UE as an IOT behavior of the UE, when all of the UE, the radio access network node and the core network node support the IOT behavior preferred or requested by the UE; and using, by the core network node, at least one IOT behavior supported by the UE, the radio access network node and the core network node as an IOT behavior of the UE, when the radio access network node or the core network node does not support the IOT behavior preferred or requested by the UE.

In some implementations, the core network node can further acquire IOT subscription information of the UE; and, the determining an IOT behavior of a UE comprises: determining, by a first node and according to the IOT capacity of the UE, the radio access network node and the core network node and the IOT subscription information of the UE, an IOT behavior of the UE, which is supported by all of the UE, the radio access network node and the core network node and allowed to access by the IOT subscription information of the UE.

In some implementations, the IOT preference information comprises: an IOT behavior preferred or requested by the UE; and, the determining an IOT behavior of a UE comprises: using, by the first node, the IOT behavior preferred or requested by the UE as an IOT behavior of the UE, when all of the UE, the radio access network node and the core network node support the IOT behavior preferred or requested by the UE and the subscription information of the UE allows the IOT behavior preferred or requested by the UE; and, using, by the first node, at least one IOT behavior, which is supported by all of the UE, the radio access network node and the core network node and is allowed by the IOT subscription information of the UE, as an IOT behavior of the UE, when the radio access network node or the core network node does not support the IOT behavior preferred or requested by the UE or the IOT subscription information of the UE does not allow the IOT behavior preferred or requested by the UE.

Optionally, the IOT subscription information comprises: an allowed IOT behavior and/or disallowed IOT behavior; and, the IOT subscription information is IOT subscription information of the UE within a current PLMN, and the IOT subscription information of the UE within different PLMNs is identical or different. The IOT behavior is described as in the step 201 and will not be repeated here.

In some implementations, the IOT service behavior information of the UE is IOT service behavior information determined by the core network node according to the IOT capacity of the UE, the radio access network node and the core network node and the IOT preference of the UE. For example, when all of the UE, the radio access network node and the core network node support the IOT behavior preferred by the UE, the IOT behavior preferred by the UE is determined as an IOT behavior of the UE; and, when the radio access network node or the core network node does not support the IOT behavior preferred by the UE, an IOT behavior supported by all of the UE, the radio access network node and the core network node is selected.

In other implementations, the IOT service behavior information of the UE is a supported IOT service behavior of the UE determined by the core network node according to the IOT capacity of the UE, the radio access network node and the core network node. For example, when both the UE and the radio access network node supports the resource optimization capacity and the service for the UE is determined as an IOT service, the core network node can determine resource allocation for optimization of data of the IOT service of the UE, for example, narrowband resource allocation.

In some implementations, the IOT service behavior information of the UE can be carried in one or more of the following message: a paging message, a broadcast message, an initial context setup request, a downlink NAS transport message, a UE context resume response, an RRC reconfiguration, a downlink information transmission, a bearer release command, and a UE radio capacity.

Optionally, the IOT service behavior information of the UE contains one or more of the following: PLMN information, IOT behavior information, UE bearer information, an IP header compression indication, a service type, Uu resource release information, resource allocation information, handover information, access stratum security context information, and GBR information.

Optionally, the PLMN information refers to a list of PLMN identifiers allowed by the determined IOT service.

Optionally, the IOT behavior information is the IOT behavior described as in the step 201 and will not be repeated here.

Optionally, the UE bearer information can further comprise one or more of the following: UE bearer identifier, a data type, a service type, Uu resource release information, resource allocation information, handover information, access stratum security context information, and GBR information.

Optionally, the IP header compression indication contains an indication of whether to perform IP header compression or is embodied by a data type. The data type comprises IP and non-IP. In some implementations, the IP header compression indication or the data type is information specific to UE bearers. In other words, each UE bearer needs to indicate a data type. When it is determined that the data bearer of the UE is non-IP, the IP compression is not performed for the UE. In some implementations, the IP header compression indication or the data type is information specific to the UE. In other words, if all the data of the UE is IP data, IP header compression is to be performed; or, if all the data of the UE is non-IP data, IP header compression is not to be performed. In some implementations, the IP header compression indication or the data type is information specific to data packets. In other words, whether to perform IP header compression is determined according to whether the data packets are IP data.

Optionally, the service type comprises one or more of the following: whether it is an IOT, whether it is IOT control plane optimization, and whether it is IOT user plane optimization. In some implementations, the service type is information specific to UE bearers. In other words, each UE bearer needs to indicate a service type, indicating whether the carried data is IOT data. In some implementations, the service type is information specific to data packets. In other words, each transmitted data packet indicates a service type, indicating whether the data is IOT data.

Optionally, the Uu resource release information can comprise one or more of the following: whether to release Uu resources, and whether to maintain a UE connection when there is no UE bearer.

Optionally, the resource allocation information can comprise one or more of the following: whether to allocate IOT resources (e.g., narrowband resources), whether to allocate wideband resources, and whether to perform resource optimization.

Optionally, the handover information can comprise one or more of the following: whether to allow to hand over the UE.

Optionally, the access stratum security context information comprises one or more of the following: whether the access stratum security context is required, whether to encrypt an access stratum, and whether to encrypt the user plane.

Optionally, the GBR bearer information comprises one or more of the following: not allowing/rejecting to establish a GBR bearer, and allowing to establish a non-GBR bearer only.

Optionally, the UE radio capacity comprises the IOT capacity of the UE. When the UE radio capacity is contained, it is indicated that the IOT behavior is IOT control plane optimization.

FIG. 3 is a schematic flowchart of a method for controlling an IOT service behavior according to the present invention, comprising the following steps.

Step 301: By a radio access network node, an IOT behavior of a UE is acquired.

Optionally, the IOT service behavior information of the UE is described as in the step 202 and will not be repeated here.

In some implementations, the radio access network node acquires, from a core network node or a UE, the IOT service behavior information of the UE determined by the core network node, and the IOT service behavior information of the UE is carried with the IOT behavior of the UE determined by the core network node.

In some implementations, the UE receives the IOT service behavior information transmitted by the core network node and then forwards the IOT service behavior information to the radio access network node.

Step 302: By the radio access network node, an IOT service behavior control is performed on the UE according to the IOT service behavior information of the UE.

Optionally, the IOT service behavior control on the UE is consistent with the content indicated by the IOT service behavior information of the UE.

In some implementations, when the determined IOT service behavior of the UE is access to non-IOT, the radio access network node can perform one or more of the following non-IOT behavior controls:

allocating wideband resources (i.e., the existing resource allocation mode) or non-IOT resources for the UE;

reconfiguring wideband resources (i.e., the existing resource allocation mode) or non-IOT resources for the UE if the UE transmits a request before the access to an IOT; and transmitting data via S1-U.

In some implementations, when the determined IOT service behavior of the UE is control plane optimization, the radio access network node can perform one or more of the following IOT control plane optimization behavior controls:

transmitting data via a control plane;

releasing Uu when monitoring that the inactive time of the control plane data transmission exceeds a set time;

allowing for no setup of any UE bearer when a connection is established;

allowing for no setup of a UE access stratum security context, and allowing for no encryption of an access stratum;

allocating IOT resources for an IOT service of the UE;

not allowing for handover;

supporting the setup of a non-GBR bearer only, and rejecting the setup of a GBR bearer;

maintaining, by the radio access network node, a connection to the UE and Uu port resources when all radio bearers of the UE are removed; and allocating NB IOT resources when the accessed radio network technology type is an NB IOT.

In some implementations, when the determined IOT service behavior of the UE is user plane optimization, the radio access network node can perform one or more of the following IOT user plane optimization behavior controls:

transmitting data via a user plane bearer;

suspending and resuming a context of the UE as required (for example, according to the data transmission demand of the UE or the setup and release of a UE connection);

allocating IOT resources for an IOT service of the UE;

not allowing for handover;

supporting the setup of a non-GBR bearer only, and rejecting the setup of a GBR bearer;

making the accessed radio network technology type be an NB IOT; and allocating IOT resources.

In some implementations, when one of the following is determined:

the IOT service behavior of the UE is resource optimization, the IOT service behavior of the UE is IOT, the service type of a UE bearer is resource optimization, and the service type of the UE bearer is IOT, the radio access network node can perform one or more of the following IOT resource optimization behavior controls:

making the accessed radio network technology type be an NB IOT;

allocating IOT resources for an IOT service of the UE;

not allowing for handover; and supporting the setup of a non-GBR bearer only, and rejecting the setup of a GBR bearer. For example, when the IOT service of the UE is carried on the user plane, for a UE bearer carrying the IOT service, IOT resources are allocated for this bearer. When the IOT service of the UE is carried on the control plane, IOT resources are allocated for a signaling bearer mapped by the control plane.

In some implementations, when the determined IOT service behavior of the UE is user plane non-optimization or S1-U data transmission, the radio access network node can perform one or more of the following IOT S1 data transmission behavior controls: transmitting data via a user plane, allocating IOT resources for the IOT service of the UE, not allowing for handover, supporting the setup of a non-GBR bearer only, and rejecting the setup of a GBR bearer.

In some implementations, when the determined IOT service behavior of the UE is short-message data transmission, the radio access network node can perform one or more of the following IOT short-message behavior controls: transmitting data via a short message, allocating IOT resources for the IOT service of the UE, not allowing for handover, supporting the setup of a non-GBR bearer only, and rejecting the setup of a GBR bearer.

In some implementations, when it is determined that the data bearer of the UE is non-IP, the IP compression is not performed for the UE.

Figure 4:
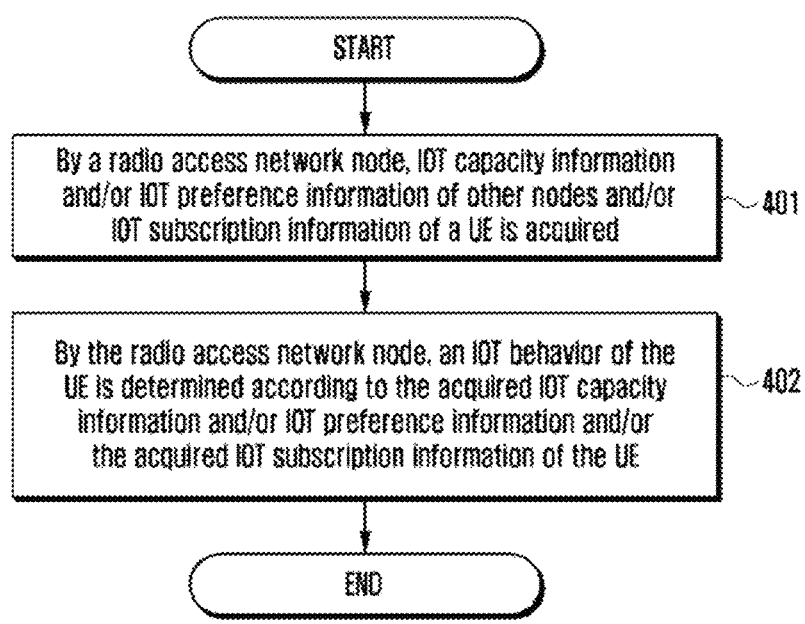
FIG. 4 is a schematic flowchart of a second method for determining an IOT service according to the present invention.

FIG. 4 is a schematic flowchart of a second method for determining an IOT service according to the present invention. This flow shows determination of an IOT service behavior of a UE by a radio access network node, and comprises the following steps.

Step 401: By a radio access network node, IOT capacity information and/or IOT preference information of other nodes and/or IOT subscription information of a UE is acquired.

Optionally, the IOT capacity information and/or IOT preference information is described as in the step 201 and will not be repeated here.

Optionally, the IOT subscription information of the UE is described as in the step 202 and will not be repeated here.

In some implementations, the radio access network node acquires, from at least one of a core network node, the UE and other radio access network nodes, the IOT capacity information and/or IOT preference information and/or the IOT subscription information of the UE.

Step 402: By the radio access network node, an IOT behavior of the UE is determined according to the acquired IOT capacity information and/or IOT preference information and/or the acquired IOT subscription information of the UE.

The process in the step 402 is consistent with the process of determining an IOT service of the UE according to the acquired IOT capacity information and/or IOT preference information and/or the acquired IOT subscription information of the UE in the step 202, and will not be repeated here.

In some implementations, the radio access network node transmits the determined IOT behavior of the UE to the UE and/or the core network node.

Figure 5:
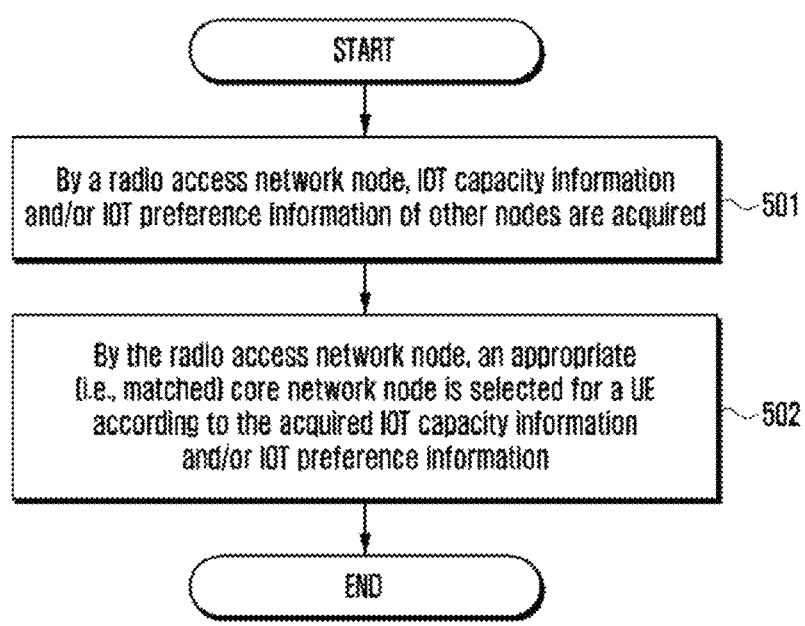
FIG. 5 is a schematic flowchart of a method for selecting a core network node according to the present invention.

FIG. 5 is a schematic flowchart of a method for selecting a core network node according to the present invention. This flow shows the selection of a core network node by a radio access network node, and comprises the following steps.

Step 501: By a radio access network node, IOT capacity information and/or IOT preference information of other nodes are acquired.

Optionally, the IOT capacity information and/or IOT preference information is described as in the step 201 and will not be repeated here.

In some implementations, the radio access network node acquires, from at least one of a core network node, a UE and other radio access network nodes, the IOT capacity information and/or IOT preference information.

Step 502: By the radio access network node, an appropriate (i.e., matched) core network node is selected for a UE according to the acquired IOT capacity information and/or IOT preference information.

Optionally, a method for selecting a core network node can comprise one or more or an intersection of more of the following:

selecting a core network node supporting the IOT preference information of the UE;

selecting a core network node supporting the IOT capacity information of the UE and the IOT preference information of the UE;

selecting a core network node supporting the IOT capacity information of the UE but not supporting the IOT preference information of the UE, and in some implementations, selecting a core network node supporting the IOT capacity information of the UE if there is no core network node supporting the IOT preference information of the UE;

selecting a core network node supporting a part of the IOT capacity of the UE, and in some implementations, selecting a core network node supporting a part of the IOT capacity of the UE if there is no core network node supporting all of the IOT capacity of the UE;

selecting a core network node supporting the IOT capacity information of the radio access network; and selecting a core network node supporting a part of the IOT capacity information of the radio access network.

Optionally, the IOT capacity information and IOT preference information of the UE/the radio access network node/the core network node are described as in the step 201 and will not be repeated here.

Figure 6:
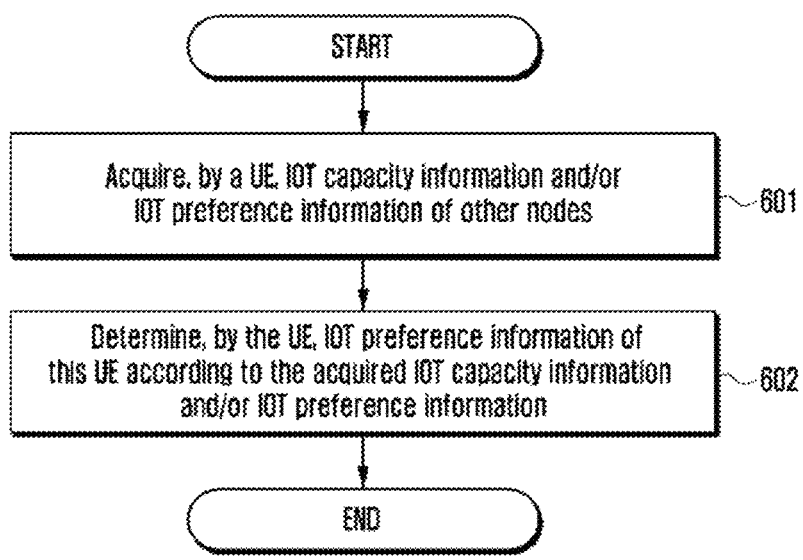
FIG. 6 is a schematic flowchart of a third method for determining an IOT service according to the present invention.

FIG. 6 is a schematic flowchart of a third method for determining an IOT service according to the present invention. This flow shows the determination of an IOT service behavior of a UE by the UE, and comprises the following steps.

Step 601: By a UE, IOT capacity information and/or IOT preference information of other nodes and/or IOT subscription information of the UE is acquired.

Optionally, the IOT capacity information and/or IOT preference information is described as in the step 201 and will not be repeated here.

Optionally, the IOT subscription information of the UE is described as in the step 202 and will not be repeated here.

In some implementations, the UE acquires, from a core network node, other UEs or other radio access network nodes, the IOT capacity information and/or IOT preference information.

Step 602: By the UE, IOT preference information or an IOT behavior of the UE is determined according to the acquired ITO capacity information and/or IOT preference information and the acquired IOT subscription information of this UE.

Optionally, the IOT preference information of this UE is described as in the step 201 and will not be repeated here.

Optionally, the IOT behavior of this UE is described as in the step 202 and will not be repeated here.

In some implementations, the UE transmits the determined IOT preference information and/or the supported IOT capacity or IOT behavior of this UE to the radio access network node or the core network node.

Optionally, a method for determining, by the UE, IOT preference information or an IOT behavior of this UE can comprise one or more or an intersection of more of the following:

IOT information subscripted by the UE;
IOT capacity supported by the UE;
IOT capacity supported by the core network node; and
IOT capacity supported by the radio access network node.

Figure 7:
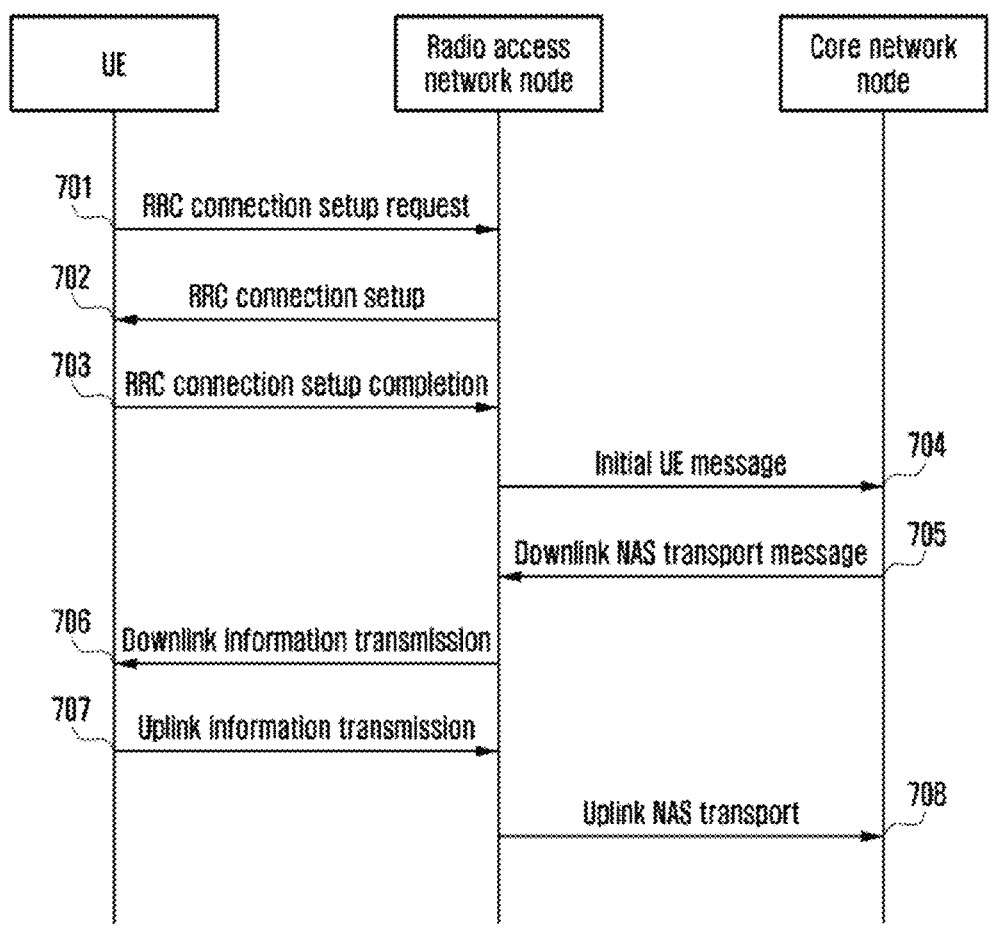
FIG. 7 is a schematic flowchart of signaling interaction according to Embodiment 1 of the present invention.

FIG. 7 is a schematic flowchart of Embodiment 1 according to the present invention. The IOT capacity information and/or IOT preference information and/or IOT subscription information mentioned hereinafter is described as in the step 201, and the IOT service behavior information of the UE hereinafter is described as in the step 201 and will not be repeated here. This method comprises the following steps.

Step 701: By a UE, an RRC connection setup request message is initiated. Optionally, this message is carried with the IOT capacity information and/or IOT preference information and/or IOT subscription information of the UE.

Step 702: By a radio access network node, an RRC connection setup message is returned to the UE. Optionally, this message is carried with the IOT capacity information and/or IOT preference information and/or IOT subscription information of a core network node or the radio access network node.

Step 703: By the UE, an RRC connection setup completion message is transmitted to a base station. Optionally, this message is carried with the IOT capacity information and/or IOT preference information and/or IOT subscription information of the UE.

Step 704: By the radio access network node, a core network node is selected for the UE, and an initial UE message or an uplink NAS transport message is transmitted to the core network node.

Optionally, the radio access network node selects a core network node for the UE according to the acquired IOT capacity information and/or IOT preference information and/or IOT subscription information. The specific process is described as in the step 502.

Optionally, this message is carried with the IOT capacity information and/or IOT preference information and/or IOT subscription information of both the UE and the core network node.

Step 705: By the core network node, an IOT service behavior of the UE is determined according to the acquired IOT capacity information and/or IOT preference information. The specific process is described as in the step 202.

When the data transmission through control plane optimization is determined or there are no other non-IOT data requests, the core network node can transmit a downlink NAS transport message to the radio access network node. Optionally, this message is carried with the determined IOT service behavior information of the UE.

Step 706: By the radio access network node, a downlink information transmission message is transmitted to the UE. Optionally, this message is carried with the determined IOT service behavior information of the UE. The IOT service behavior information is specifically described as in the step 202.

Step 707: Optionally, by the UE, an uplink information transmission message is transmitted to the radio access network node.

Step 708: Optionally, by the radio access network node, an uplink NAS transport message is transmitted to the core network node.

Figure 8:
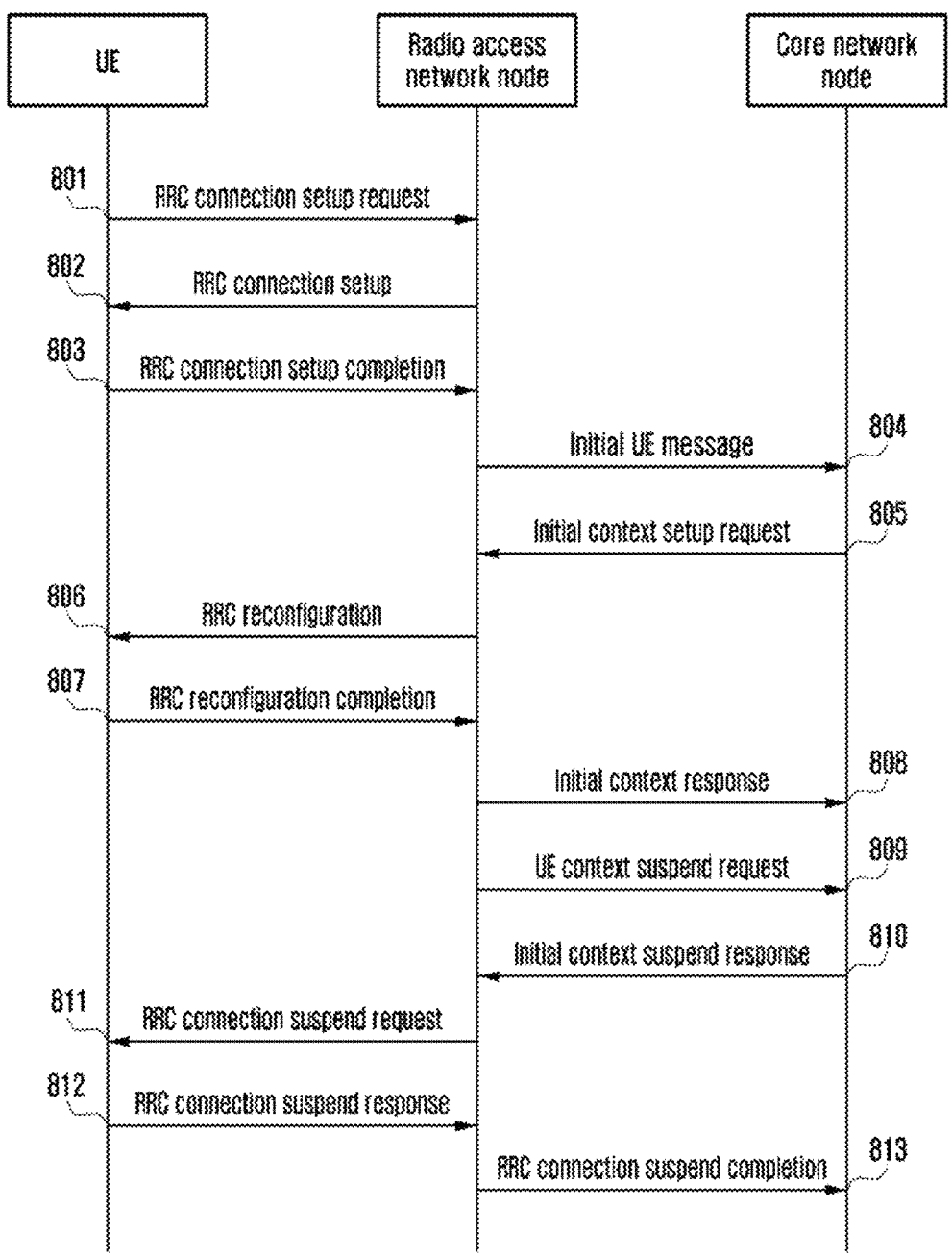
FIG. 8 is a schematic flowchart of signaling interaction according to Embodiment 2 of the present invention.

FIG. 8 is a schematic flowchart of signaling interaction according to Embodiment 2 of the present invention. The IOT capacity information and/or IOT preference information and/or IOT subscription information mentioned hereinafter is described as in the step 202, and the IOT service behavior information of the UE hereinafter is described as in the step 201 and will not be repeated here. This method comprises the following steps.

Steps 801 to 804 are consistent with the steps 701 to 704 and will not be repeated here.

Step 805: By the core network node, an IOT service behavior of the UE is determined according to the IOT capacity information and/or IOT preference information and/or IOT subscription information. The specific process is described as in the step 202.

When the data transmission through user plane optimization is determined or there are other non-IOT data requests, the core network node can transmit an initial context setup request message to the radio access network node. Optionally, this message is carried with the determined IOT service behavior information of the UE.

Step 806: By the radio access network node, an RRC reconfiguration message is transmitted to the UE. Optionally, this message is carried with the determined IOT service behavior information of the UE.

Step 807: By the UE, an RRC reconfiguration completion message is returned to the radio access network node.

Step 808: By the radio access network node, an initial context setup response message is transmitted to an MME.

Step 809: When there is no data transmission requirement or the UE is inactive overtime, a UE context suspension request message is transmitted to the core network node by the radio access network node.

Step 810: By the core network node, an S1-U bearer is removed for an SGW, a UE context is suspended, and a response indicating the expiration of the UE context is returned to the UE.

Step 811: By the radio access network node, a suspension request is transmitted to the UE.

Step 812: By the UE, the UE context is suspended, a suspension response is returned to the radio access network node, and a UE connection is released.

Step 813: Optionally, by the radio access network node, a UE context suspension completion is transmitted to the core network node.

Figure 9:
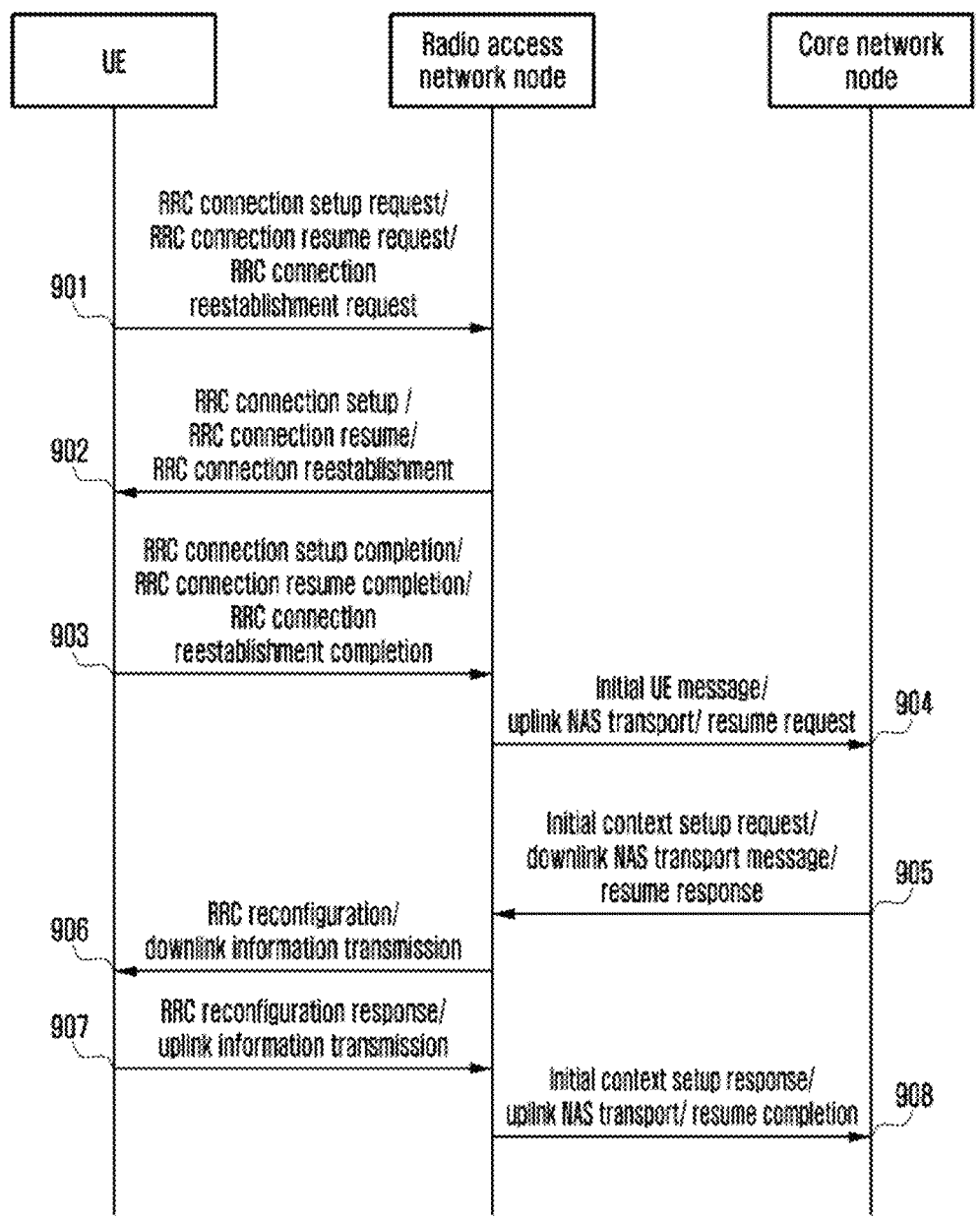
FIG. 9 is a schematic flowchart of signaling interaction according to Embodiment 3 of the present invention.

FIG. 9 is a schematic flowchart of signaling interaction according to Embodiment 3 of the present invention. The IOT capacity information and/or IOT preference information and/or IOT subscription information mentioned hereinafter is described as in the step 201, and the IOT service behavior information of the UE hereinafter is described as in the step 202 and will not be repeated here. This method comprises the following steps.

Step 901: By a UE, an RRC connection setup request message/an RRC connection resume request message/an RRC connection setup request message is transmitted to a radio access network node. Optionally, this message is carried with the IOT capacity information and/or IOT preference information and/or IOT subscription information of the UE.

Step 902: By the radio access network node, an RRC connection setup/RRC connection resume/RRC connection reestablishment message is returned to the UE. Optionally, this message is carried with the IOT capacity information and/or IOT preference information and/or IOT subscription information of a core network node or the radio access network node.

Step 903: By the UE, an RRC connection setup completion message/an RRC connection resume completion/an RRC connection reestablishment completion message is transmitted to a base station. Optionally, this message is carried with the IOT capacity information and/or IOT preference information and/or IOT subscription information of the UE.

Step 904: By the radio access network node, a core network node is selected for the UE, and an initial UE message/an uplink NAS transport message/a resume request message is transmitted to the core network node.

Optionally, the radio access network node selects a core network node for the UE according to the acquired IOT capacity information and/or IOT preference information and/or IOT subscription information. The specific process is described as in the step 502.

Optionally, this message is carried with the IOT capacity information and/or IOT preference information and/or IOT subscription information of both the UE and the core network node.

Step 905: By the core network node, an IOT service behavior of the UE is determined according to the IOT capacity information and/or IOT preference information and/or IOT subscription information. The specific process is described as in the step 202.

The core network node transmits an initial context setup request message/a downlink NAS transport message/a resume response message is transmitted to the radio access network node. Optionally, this message is carried with the determined IOT service behavior information of the UE.

Step 906: By the radio access network node, a downlink information transmission message/an RRC reconfiguration message is transmitted to the UE. Optionally, this message is carried with the determined IOT service behavior information of the UE. The IOT service behavior information of the UE is specifically described as in the step 202.

Step 907: Optionally, by the UE, an uplink information transmission message/an RRC reconfiguration completion message is transmitted to the radio access network node.

Step 908: Optionally, by the radio access network node, an initial context setup response message/an uplink NAS transport message/a UE context resume completion message is transmitted to the core network node.

Figure 10:
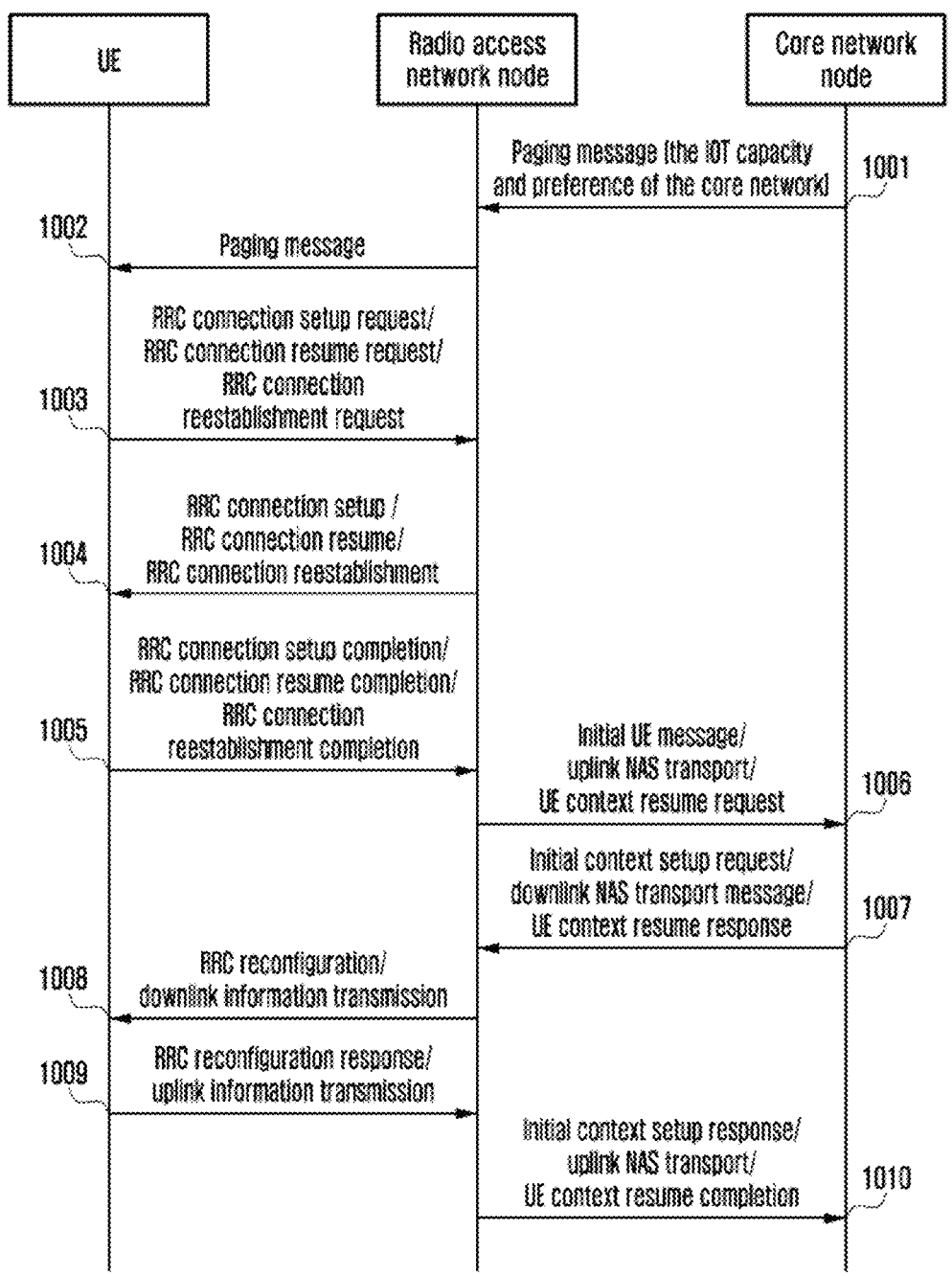
FIG. 10 is a schematic flowchart of signaling interaction according to Embodiment 4 of the present invention.

FIG. 10 is a schematic flowchart of signaling interaction according to Embodiment 4 of the present invention. The IOT capacity information and/or IOT preference information and/or IOT subscription information mentioned hereinafter is described as in the step 201, and the IOT service behavior information of the UE hereinafter is described as in the step 202 and will not be repeated here. This method comprises the following steps.

Step 1001: By a core network node, a downlink data notification about a UE is received. The core network node transmits a paging message about the UE to a radio access network node.

Optionally, this message is carried with the IOT capacity information and/or IOT preference information and/or IOT subscription information of the radio access network node or the core network node. Optionally, this message is carried with the determined IOT service behavior information of the UE.

Step 1002: By the radio access network node, the paging message is transmitted to the UE.

Optionally, this message is carried with one or more of the following information: the IOT capacity information and/or IOT preference information and/or IOT subscription information of the radio access network node or the core network node, and the determined IOT service behavior information of the UE. The UE can determine IOT information preferred by the UE according to the received information.

Steps 1003 to 1010 are consistent with the steps 901 to 908 and will not be repeated here.

Figure 11:
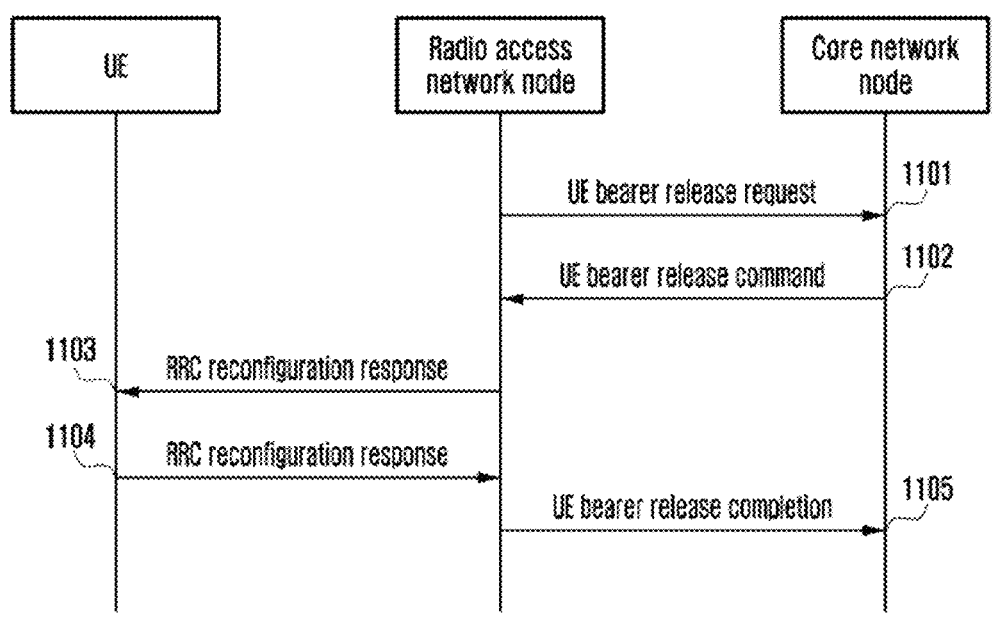
FIG. 11 is a schematic flowchart of signaling interaction according to Embodiment 5 of the present invention.

FIG. 11 is a schematic flowchart of signaling interaction according to Embodiment 5 of the present invention. The IOT capacity information and/or IOT preference information and/or IOT subscription information mentioned hereinafter is described as in the step 201, and the IOT service behavior information of the UE hereinafter is described as in the step 202 and will not be repeated here. This method comprises the following steps.

Step 1101: By a radio access network node, a UE bearer release request is transmitted to a core network node.

Step 1102: By the core network node, a UE bearer release command message is transmitted to the radio access network node. Optionally, this message is carried with the determined IOT service behavior information of the UE. When the IOT service behavior information indicates IOT control plane optimization, and when all bearers of the UE are removed, resources at a Uu port are still allowed to be reserved or a UE connection is still allowed to be maintained.

Step 1103: By the radio access network node, an RRC reconfiguration message is transmitted to a Uu, and corresponding UE bearers are removed. Optionally, this message is carried with the determined IOT service behavior information of the UE. When the IOT service behavior information indicates IOT control plane optimization, and when all bearers of the UE are removed, resources at the Uu port are still allowed to be reserved or a UE connection is still allowed to be maintained.

Step 1104: By the UE, an RRC reconfiguration completion is returned to the radio access network node.

Step 1105: By the radio access network node, a UE bearer release completion is transmitted to the core network node.

Figure 12:
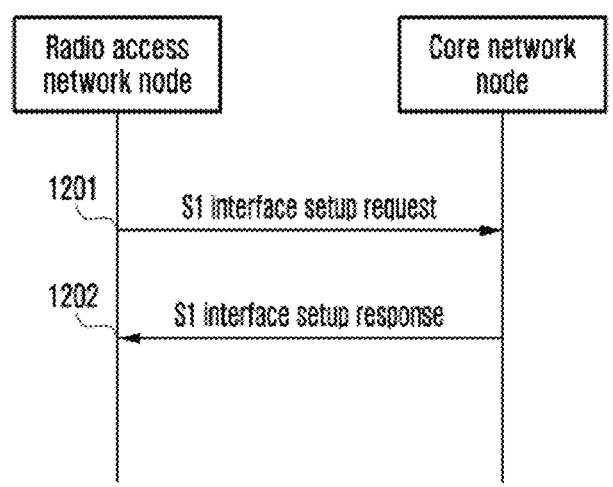
FIG. 12 is a schematic flowchart of signaling interaction according to Embodiment 6 of the present invention.

FIG. 12 is a schematic flowchart of signaling interaction according to Embodiment 6 of the present invention. The IOT capacity information and/or IOT preference information and/or IOT subscription information mentioned hereinafter is described as in the step 201, and the IOT service behavior information of the UE hereinafter is described as in the step 202 and will not be repeated here. This method comprises the following steps.

Step 1201: By a radio access network node, an S1 interface setup request message is transmitted to a core network node. Optionally, this message is carried with the IOT capacity information and/or IOT preference information and/or IOT subscription information of the radio access network.

Step 1202: By the core network node, an S1 interface setup response message is transmitted to the radio access network node.

Optionally, this message is carried with the IOT capacity information and/or IOT preference information and/or IOT subscription information of the radio access network.

Figure 13:
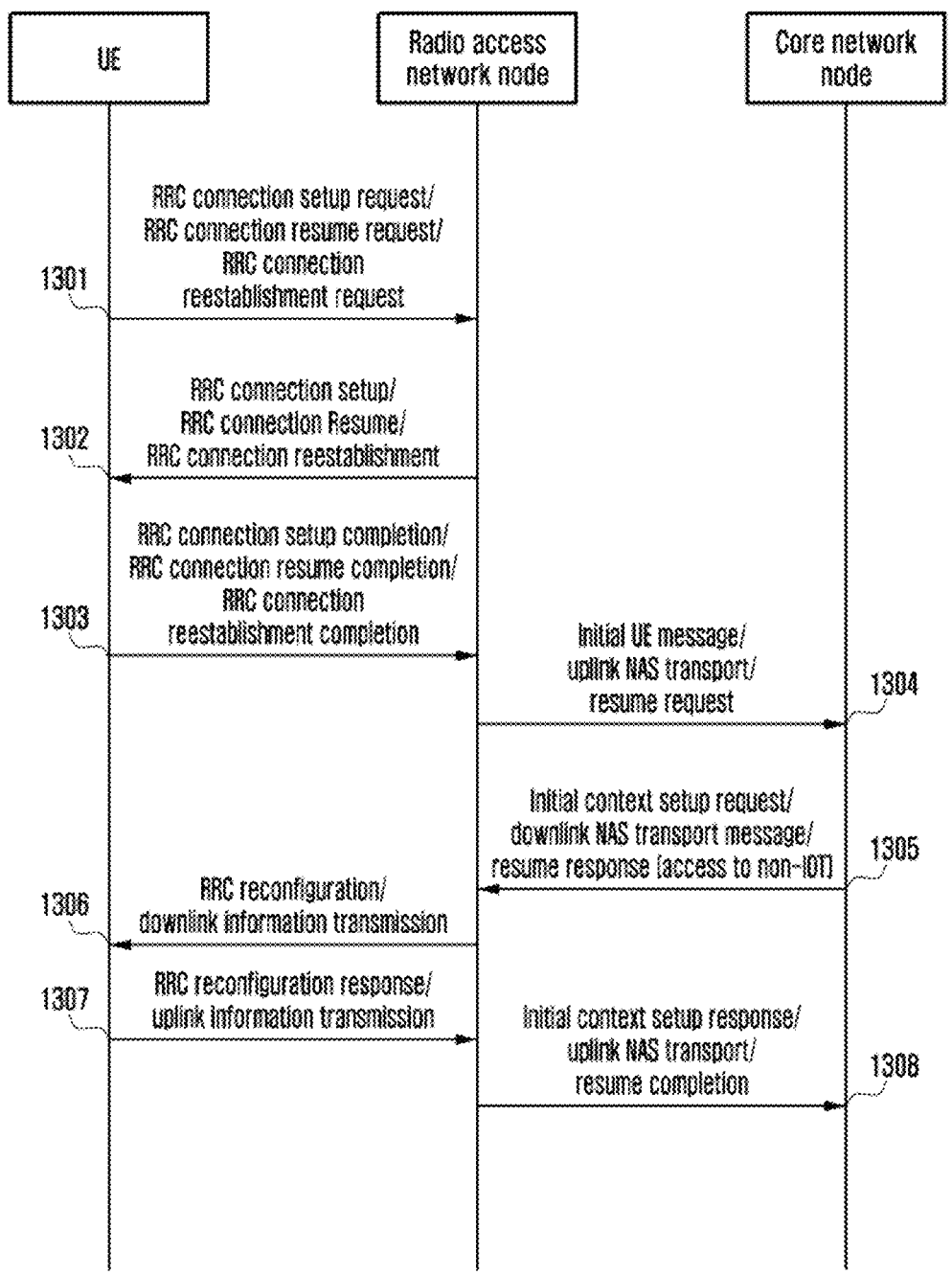
FIG. 13 is a schematic flowchart of signaling interaction according to Embodiment 7 of the present invention.

FIG. 13 is a schematic flowchart of signaling interaction according to Embodiment 7 of the present invention. The IOT capacity information and/or IOT preference information and/or IOT subscription information mentioned hereinafter is described as in the step 201, and the IOT service behavior information of the UE hereinafter is described as in the step 202 and will not be repeated here. This method comprises the following steps.

Steps 1301 to 1305 are consistent with the steps 901 to 906 and will not be repeated here.

Step 1306: By the radio access network node, an IOT service behavior control is performed according to the received IOT service behavior information, as described in step 302. When the determined IOT service behavior of the UE is access to non-IOT, the radio access network node can perform one or more of the following non-IOT behavior controls:

allocating wideband resources (i.e., the existing resource allocation mode) or non-IOT resources for the UE;

reconfiguring wideband resources (i.e., the existing resource allocation mode) or non-IOT resources for the UE if the UE transmits a request before the access to an IOT; and transmitting data via S1-U.

Step 1307: A downlink information transmission message/an RRC reconfiguration message is transmitted to the UE. Optionally, this message is carried with the determined IOT service behavior information of the UE. The IOT service behavior information of the UE is specifically described as in the step 202. A base station configures or reconfigures wideband resources for the UE.

Step 1308: Optionally, by the UE, an uplink information transmission message/an RRC reconfiguration completion message is transmitted to the radio access network node.

Step 1309: Optionally, by the radio access network node, an initial context setup response message/an uplink NAS transport message/a UE context resume completion message is transmitted to the core network node.

Figure 14:
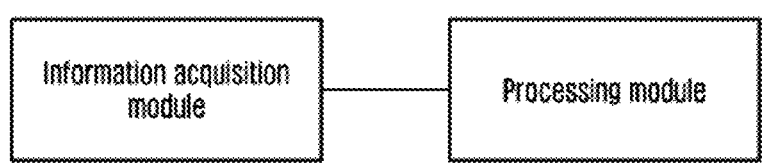
FIG. 14 is a schematic diagram of a composition structure of a preferred equipment for determining an IOT service according to the present invention.

Corresponding to the above methods, the present application further provides an equipment for determining an IOT service. FIG. 14 shows a composition structure diagram of the equipment. This equipment comprises: an information acquisition module and a processing module, wherein:

the information acquisition module is configured to acquire, from a second node, IOT capacity information and/or IOT preference information and/or IOT subscription information; and the processing module is configured to determine an IOT behavior of a UE according to the acquired IOT capacity information and/or IOT preference information and/or IOT subscription information.

Figure 15:
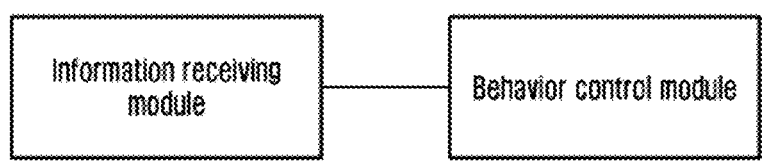
FIG. 15 is a schematic diagram of a composition structure of a preferred equipment for controlling an IOT service behavior according to the present invention.

Corresponding to the above methods, the present application further provides an equipment for controlling an IOT service behavior, as shown in FIG. 15, comprising an information receiving module and a behavior control module, wherein:

the information receiving module is configured to receive an IOT behavior of a UE determined by a first node; and the behavior control module is configured to perform a corresponding IOT service behavior control on the UE according to the IOT behavior of the UE.

Figure 16:
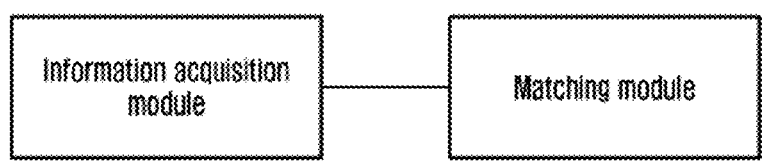
FIG. 16 is a schematic diagram of a composition structure of a preferred equipment for selecting a core network node according to the present invention.

Corresponding to the above methods, the present application further provides an equipment for selecting a core network node, as shown in FIG. 16, comprising an information acquisition module and a matching module, wherein:

the information acquisition module is configured to acquire, from a second node, IOT capacity information and/or IOT preference information and/or subscription information; and the matching module is configured to select a matched core network node for a UE according to the acquired IOT capacity information and/or IOT preference information and/or IOT subscription information.

It can be seen from the technical solutions that, by distinguishing the IOT capacity information and IOT preference information of a UE, a radio access network node and a core network node, and determining the IOT resource optimization and IOT data transmission mode of the UE, the overhead for signaling resources can be effectively reduced and the utilization ratio of resources can improved, so that it is favorable for a huge number of IOT equipments to access a network.

The above description merely shows preferred embodiments of the present invention and is not intended to limit the present invention. Any modification, equivalent replacement or improvement made within the spirit and principle of the present invention shall fall into the protection scope of the present invention.

The invention claimed is:

1. A method performed by a user equipment (UE) in a wireless communication system, the method comprising:
receiving, from a base station, a radio resource control (RRC) connection setup message;
in response to the RRC connection setup message, transmitting, to the base station, a RRC connection setup complete message including at least one of first information on internet of things (IoT) behavior supported by the UE, second information on IoT behavior preferred by the UE, or information indicating the UE supports user plane cellular internet of things (CIoT) optimization;
receiving, from the base station, a RRC connection reconfiguration message including third information on IoT behavior accepted by a network, the third information being identified based on the at least one of the first information or the second information; and
transmitting user data based on the third information.

2. The method of claim 1, wherein the IoT behavior includes at least one of control plane CIoT optimization, user plane CIoT optimization, or S1-U data transmission.

3. The method of claim 1, wherein transmitting the user data comprises:
in case that the third information includes control plane CIoT optimization, transmitting the user data over control plane via a mobility management entity (MME) without bearer establishment.

4. The method of claim 1, wherein transmitting the user data comprises:
in case that the user plane CIoT optimization is accepted and an inactivity timer of the UE has expired, receiving, from the base station, a RRC connection suspend message for suspending a RRC connection of the UE; and in case that there is a data transmission requirement for the UE, transmitting, to the base station, a RRC connection resume message for resuming the RRC connection of the UE.

5. A method performed by a base station in a wireless communication system, the method comprising:
   transmitting, to a user equipment (UE), a radio resource control (RRC) connection setup message;
   in response to the RRC connection setup message, receiving, from the UE, a RRC connection setup complete message including at least one of first information on internet of things (IoT) behavior supported by the UE, second information on IoT behavior preferred by the UE, or information indicating the UE supports user plane cellular internet of things (CIoT) optimization;
   identifying a mobility management entity (MME) for the UE based on the information indicating the UE supports the user plane CIoT optimization;
   transmitting, to the MME, an initial UE message including the at least one of the first information or the second information;
   receiving, from the MME, an initial context setup request message including third information on IoT behavior accepted by a network, the third information being identified based on the at least one of the first information or the second information; and
   transmitting, to the UE, a RRC connection reconfiguration message including the third information.

6. The method of claim 5, wherein the IoT behavior includes at least one of control plane CIoT optimization, user plane CIoT optimization, or S1-U data transmission.

7. The method of claim 5, further comprising:
   in case that the user plane CIoT optimization is accepted and an inactivity timer of the UE has expired:
      transmitting, to the MME, a UE context suspend request message;
      transmitting, to the UE, a RRC connection suspend message for suspending a RRC connection of the UE; and
      in case that there is a data transmission requirement, receiving, from the UE, a RRC connection resume request message for resuming the RRC connection of the UE.

8. A method performed by a mobility management entity (MME) in a wireless communication system, the method comprising:
   receiving, from a base station, an initial user equipment (UE) message including at least one of first information on internet of things (IoT) behavior supported by a UE or second information on IoT behavior preferred by the UE;
   identifying third information on IoT behavior accepted by a network based on the at least one of the first information or the second information; and
   transmitting, to the base station, an initial context setup request message including the third information.

9. The method of claim 8, wherein the IoT behavior includes at least one of control plane cellular internet of things (CIoT) optimization, user plane CIoT optimization, or S1-U data transmission.

10. The method of claim 8, further comprising:
    in case that user plane CIoT optimization is accepted and an inactivity timer of the UE has expired, receiving, from the base station, a UE context suspend request message.

11. A user equipment (UE) in a wireless communication system, the UE comprising:
    a transceiver; and
    a controller coupled with the transceiver and configured to:
       receive, from a base station, a radio resource control (RRC) connection setup message;
       in response to the RRC connection setup message, transmit, to the base station, a RRC connection setup complete message including at least one of first information on internet of things (IoT) behavior supported by the UE, second information on IoT behavior preferred by the UE, or information indicating the UE supports user plane cellular internet of things (CIoT) optimization;
       receive, from the base station, a RRC connection reconfiguration message including third information on IoT behavior accepted by a network, the third information being identified based on the at least one of the first information or the second information; and
       transmit user data based on the third information.

12. The UE of claim 11, wherein the IoT behavior includes at least one of control plane CIoT optimization, user plane CIoT optimization, or S1-U data transmission.

13. The UE of claim 11, wherein the controller is configured to:
    in case that the third information includes control plane CIoT optimization, transmit the user data over control plane via a mobility management entity (MME) without bearer establishment.

14. The UE method of claim 11, wherein the controller is configured to:
    in case that the user plane CIoT optimization is accepted and an inactivity timer of the UE has expired, receive, from the base station, a RRC connection suspend message for suspending a RRC connection of the UE; and
    in case that there is a data transmission requirement for the UE, transmit, to the base station, a RRC connection resume message for resuming the RRC connection of the UE.

15. A base station in a wireless communication system, the base station comprising:
    a transceiver; and
    a controller coupled with the transceiver and configured to:
       transmit, to a user equipment (UE), a radio resource control (RRC) connection setup message;
       in response to the RRC connection setup message, receive, from the UE, a RRC connection setup complete message including at least one of first information on internet of things (IoT) behavior supported by the UE, second information on IoT behavior preferred by the UE, or information indicating the UE supports user plane cellular internet of things (CIoT) optimization;
       identify a mobility management entity (MME) for the UE based on the information indicating the UE supports the user plane CIoT optimization;
       transmit, to the MME, an initial UE message including the at least one of the first information or the second information;
       receive, from the MME, an initial context setup request message including third information on IoT behavior accepted by a network, the third information being identified based on the at least one of the first information or the second information; and transmit, to the UE, a RRC connection reconfiguration message including the third information.

16. The base station of claim 15, wherein the IoT behavior includes at least one of control plane CIoT optimization, user plane CIoT optimization, or S1-U data transmission.

17. The base station of claim 15, wherein the controller is further configured to:
  in case that the user plane CIoT optimization is accepted and an inactivity timer of the UE has expired:
    transmit, to the MME, a UE context suspend request message;
    transmit, to the UE, a RRC connection suspend message for suspending a RRC connection of the UE; and
  in case that there is a data transmission requirement, receive, from the UE, a RRC connection resume message for resuming the RRC connection of the UE.

18. A mobility management entity (MME) in a wireless communication system, the MME comprising:
  a transceiver; and
  a controller coupled with the transceiver and configured to:
    receive, from a base station, an initial user equipment (UE) message including at least one of first information on internet of things (IoT) behavior supported by a UE or second information on IoT behavior preferred by the UE;
    identify third information on IoT behavior accepted by a network based on the at least one of the first information or the second information; and
    transmit, to the base station, an initial context setup request message including the third information.

19. The MME of claim 18, wherein the IoT behavior includes at least one of control plane cellular internet of things (CIoT) optimization, user plane CIoT optimization, or S1-U data transmission.

20. The MME of claim 18, wherein the controller is further configured to:
  in case that user plane CIoT optimization is accepted and an inactivity timer of the UE has expired, receive, from the base station, a UE context suspend request message.

* * * * *

UNITED STATES PATENT AND TRADEMARK OFFICE
CERTIFICATE OF CORRECTION

PATENT NO. : 10,841,768 B2  
APPLICATION NO. : 16/069153  
DATED : November 17, 2020  
INVENTOR(S) : Ke et al.

Page 1 of 1

It is certified that error appears in the above-identified patent and that said Letters Patent is hereby corrected as shown below:

On the Title Page

Item (30) Foreign Application Priority Data:  
"Jan. 11, 2016 (CN).............. 2016 1 0016970"  
Should read:  
-- Jan. 11, 2016 (CN).............. 201610016970.X --.

Signed and Sealed this  
Fifteenth Day of August, 2023

Katherine Kelly Vidal  
*Director of the United States Patent and Trademark Office*